US012672130B2

(12) United States Patent
Su et al.

(10) Patent No.: US 12,672,130 B2
(45) Date of Patent: Jun. 30, 2026

(54) ENHANCEMENT FOR UPLINK DATA TRANSMISSION

(71) Applicant: Telefonaktiebolaget LM Ericsson (publ), Stockholm (SE)

(72) Inventors: Ling Su, Beijing (CN); Zhipeng Lin, Nanjing (CN); Johan Axnäs, Solna (SE); Robert Mark Harrison, Grapevine, TX (US); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 517 days.

(21) Appl. No.: 18/248,558

(22) PCT Filed: Oct. 14, 2021

(86) PCT No.: PCT/CN2021/123792
§ 371 (c)(1),
(2) Date: Apr. 11, 2023

(87) PCT Pub. No.: WO2022/078441
PCT Pub. Date: Apr. 21, 2022

(65) Prior Publication Data
US 2023/0403702 A1 Dec. 14, 2023

(30) Foreign Application Priority Data
Oct. 16, 2020 (WO) ................ PCT/CN2020/121502

(51) Int. Cl.
*H04W 4/00* (2018.01)
*H04W 72/1268* (2023.01)
*H04W 72/542* (2023.01)

(52) U.S. Cl.
CPC ..... *H04W 72/1268* (2013.01); *H04W 72/542* (2023.01)

(58) Field of Classification Search
USPC .................................................. 370/329, 330
See application file for complete search history.

(56) References Cited

U.S. PATENT DOCUMENTS

2013/0035084 A1 2/2013 Song et al.
2017/0273113 A1* 9/2017 Tirronen ............... H04W 72/23
(Continued)

FOREIGN PATENT DOCUMENTS

| CN | 111052843 A | 4/2020 |
|----|-------------|--------|
| CN | 111418248 A | 7/2020 |
| WO | 2020119615 A1 | 6/2020 |

OTHER PUBLICATIONS

Extended European Search Report for European Patent Application No. 21879484.0, mailed Oct. 14, 2024, 10 pages.
(Continued)

*Primary Examiner* — Chuong T Ho
(74) *Attorney, Agent, or Firm* — Withrow & Terranova, PLLC

(57) ABSTRACT

The present disclosure is related to the field of telecommunication, and in particular, to enhancement for uplink data transmission. A method at a terminal device comprises: receiving, from a network node, a first message indicating at least one parameter for a Physical Uplink Shared Channel (PUSCH) transmission; and transmitting, to the network node, the PUSCH transmission at least partially based on the first message. A method at a network node comprises: transmitting, to a terminal device, a first message indicating at least one parameter for a Physical Uplink Shared Channel (PUSCH) transmission; and receiving, from the terminal device, the PUSCH transmission at least partially based on the first message.

19 Claims, 14 Drawing Sheets

10

(56) References Cited

U.S. PATENT DOCUMENTS

| | | | | |
|---|---|---|---|---|
| 2018/0084578 | A1 | 3/2018 | Kato et al. | |
| 2020/0106559 | A1 | 4/2020 | Vilaipornsawai et al. | |
| 2021/0076244 | A1* | 3/2021 | Tie | H04W 24/10 |
| 2021/0218437 | A1* | 7/2021 | Khoshnevisan | H04L 1/1896 |
| 2022/0110163 | A1* | 4/2022 | Kwak | H04W 74/0833 |
| 2022/0232615 | A1* | 7/2022 | Luo | H04L 1/0025 |
| 2023/0189129 | A1* | 6/2023 | Liu | H04W 48/12 |
| | | | | 455/434 |
| 2023/0292312 | A1* | 9/2023 | Khoshnevisan | H04L 1/1887 |

OTHER PUBLICATIONS

Author Unknown, "Technical Specification Group Radio Access Network; NR; Physical channels and modulation (Release 16)," Technical Specification 38.211, Version 16.3.0, Sep. 2020, 3GPP Organizational Partners, 133 pages.

Author Unknown, "Technical Specification Group Radio Access Network; NR; Multiplexing and channel coding (Release 16)," Technical Specification 38.212, Version 16.3.0, Sep. 2020, 3GPP Organizational Partners, 152 pages.

Author Unknown, "Technical Specification Group Radio Access Network; NR; Physical layer procedures for control (Release 16)," Technical Specification 38.213, Version 16.3.0, Sep. 2020, 3GPP Organizational Partners, 179 pages.

Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.

Author Unknown, "Technical Specification Group Radio Access Network; NR; Physical layer procedures for data (Release 16),"

Technical Specification 38.214, Version 16.3.0, Sep. 2020, 3GPP Organizational Partners, 166 bages.

Author Unknown, "Technical Specification Group Radio Access Network; NR; Medium Access Control (MAC) protocol specification (Release 16)," Technical Specification 38.321, Version 16.2.1, Sep. 2020, 3GPP Organizational Partners, 154 pages.

Author Unknown, "Technical Specification Group Radio Access Network; NR; Radio Resource Control (RRC) protocol specification (Release 16)," Technical Specification 38.331, Version 16.1.0, Jul. 2020, 3GPP Organizational Partners, 906 pages.

Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.

Huawei, et al., "R1-1703868: WF on grant-free repetitions," 3GPP TSG RAN WG1 Meeting #88, Feb. 13-17, 2017, Athens, Greece, 2 pages.

Ericsson, "R1-2008419: PUSCH coverage enhancement," 3GPP TSG-RAN WG1 Meeting #103-e, Oct. 26-Nov. 13, 2020, Electronic Meeting, 11 pages.

Moderator (China Telecom), "R1-2007404: [102-e-NR-CovEnh-03] Email discussion/approval on PUSCH coverage enhancement," 3GPP TSG RAN WG1 Meeting #102-e, Aug. 17-28, 2020, Electronic Meeting, 93 pages.

International Search Report and Written Opinion for International Patent Application No. PCT/CN2021/123792, mailed Jan. 21, 2022, 10 pages.

International Preliminary Report on Patentability for International Patent Application No. PCT/CN2021/123792, mailed Dec. 20, 2022, 5 pages.

\* cited by examiner

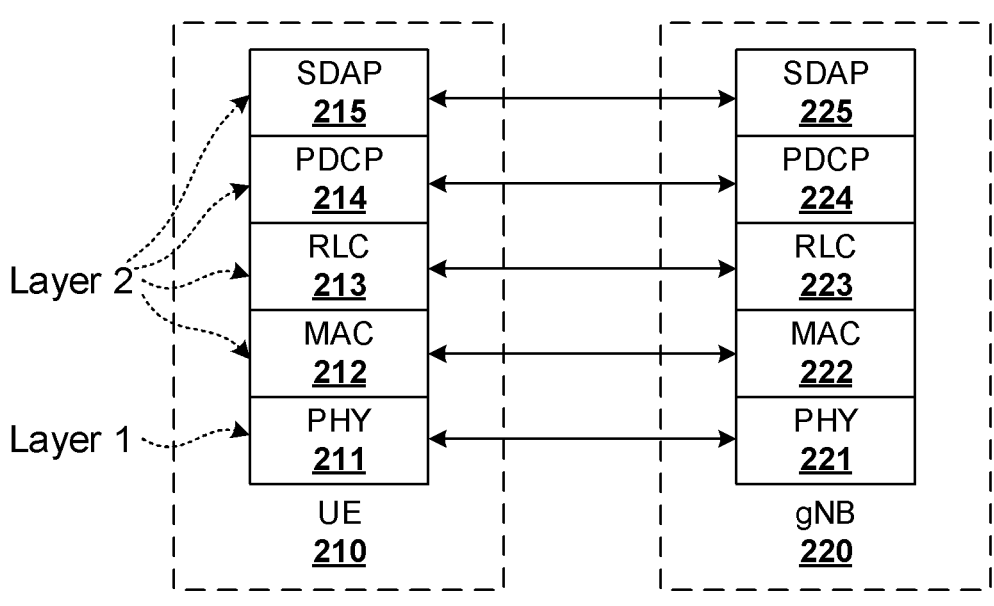
User Plane
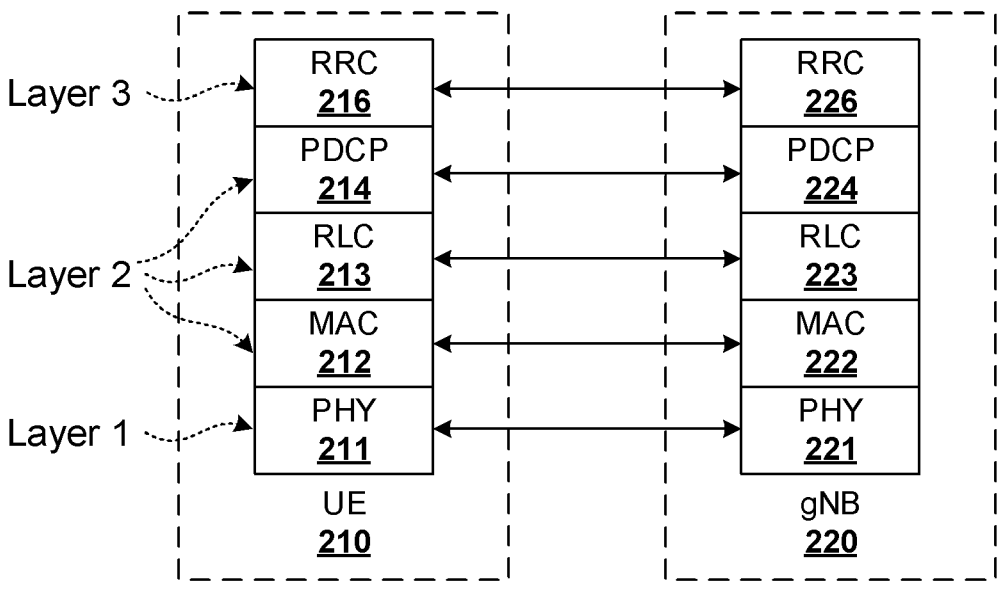
Control Plane
FIG. 2

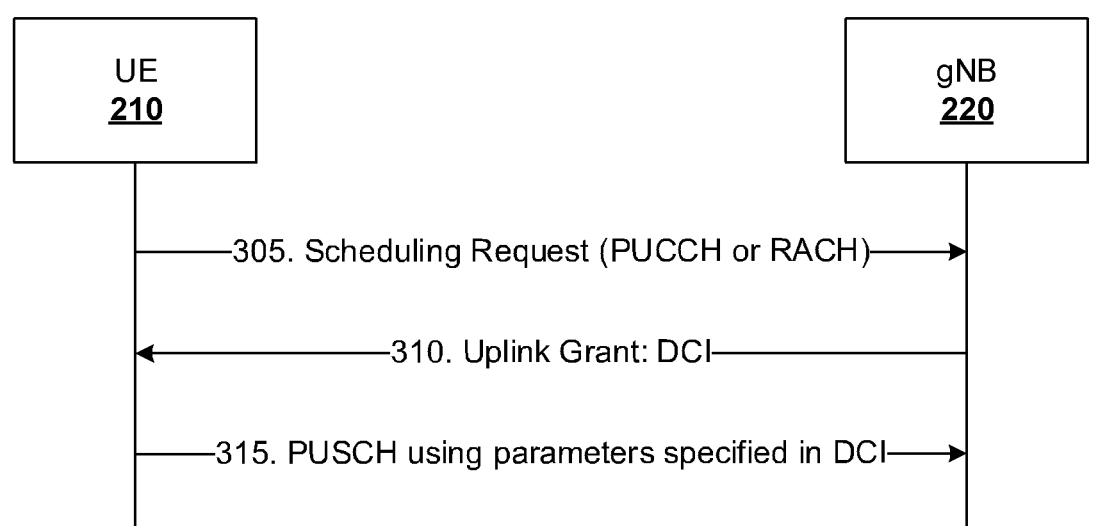
(a) dynamic scheduling of PUSCH transmission
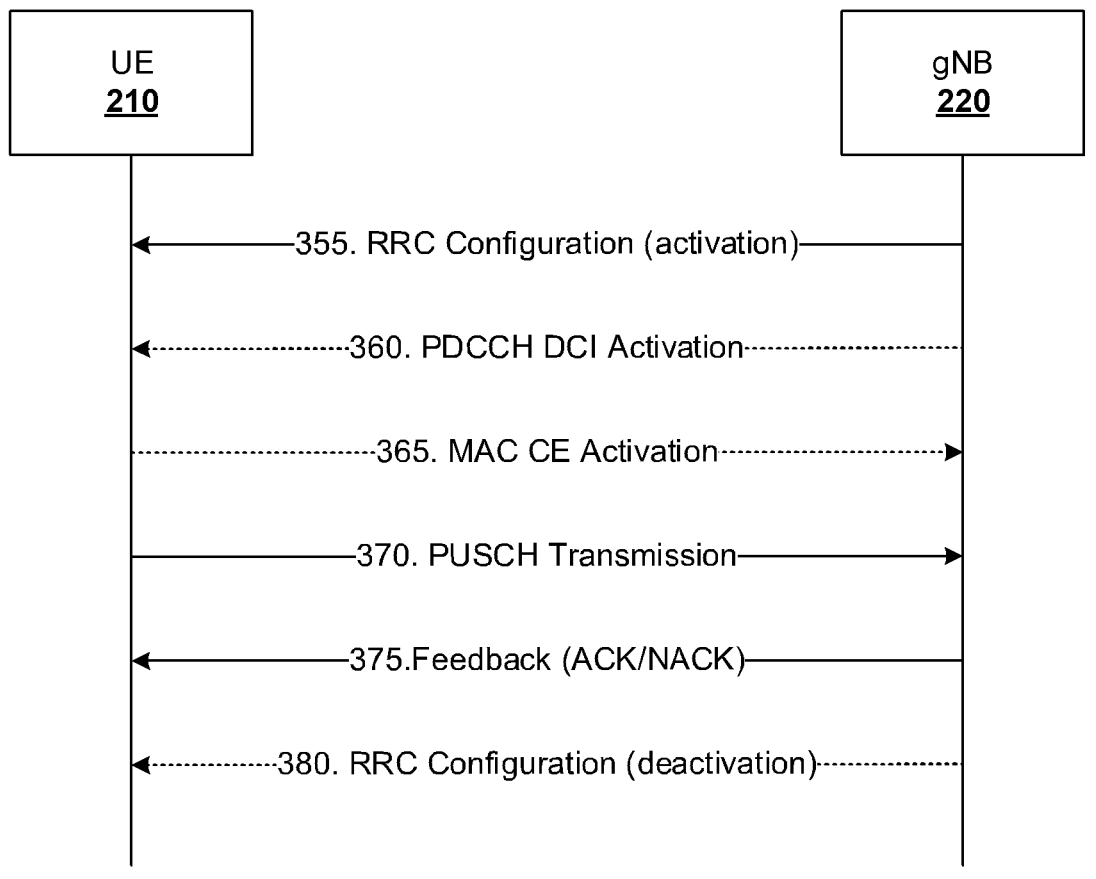
(b) grant free PUSCH transmission
FIG. 3

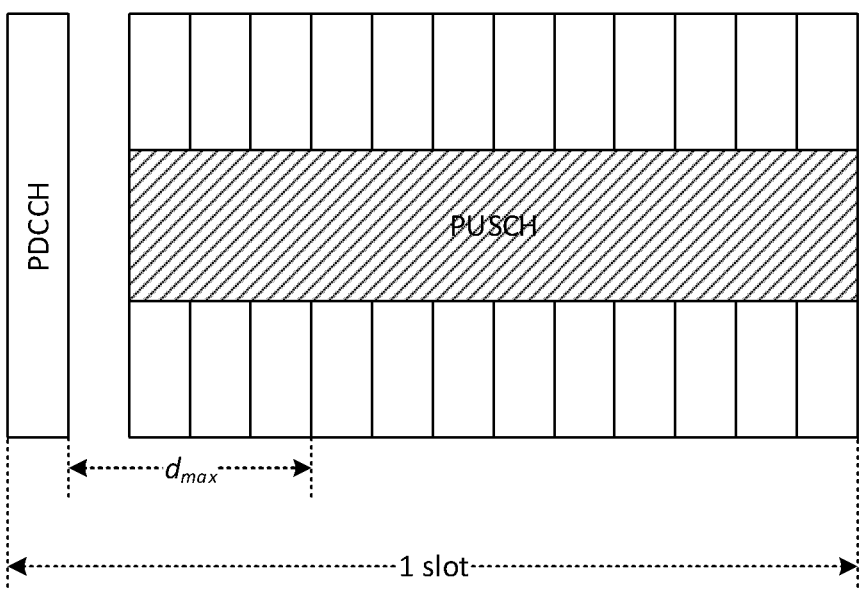
(a) without early termination
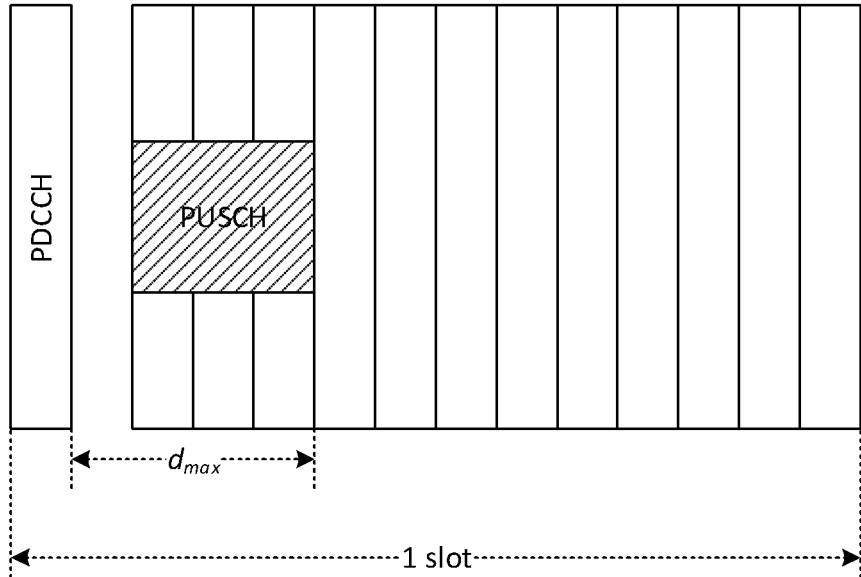
(b) with early termination
FIG. 5

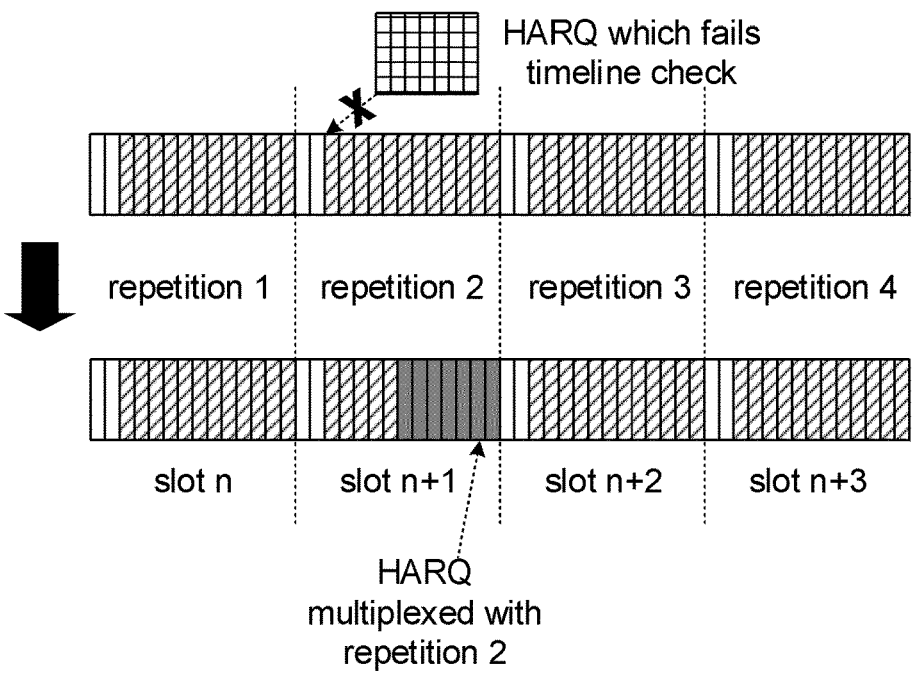

HARQ which fails timeline check repetition 1    repetition 2    repetition 3    repetition 4 slot n    slot n+1    slot n+2    slot n+3

HARQ multiplexed with repetition 2

(a) conflict resolving by multiplexing

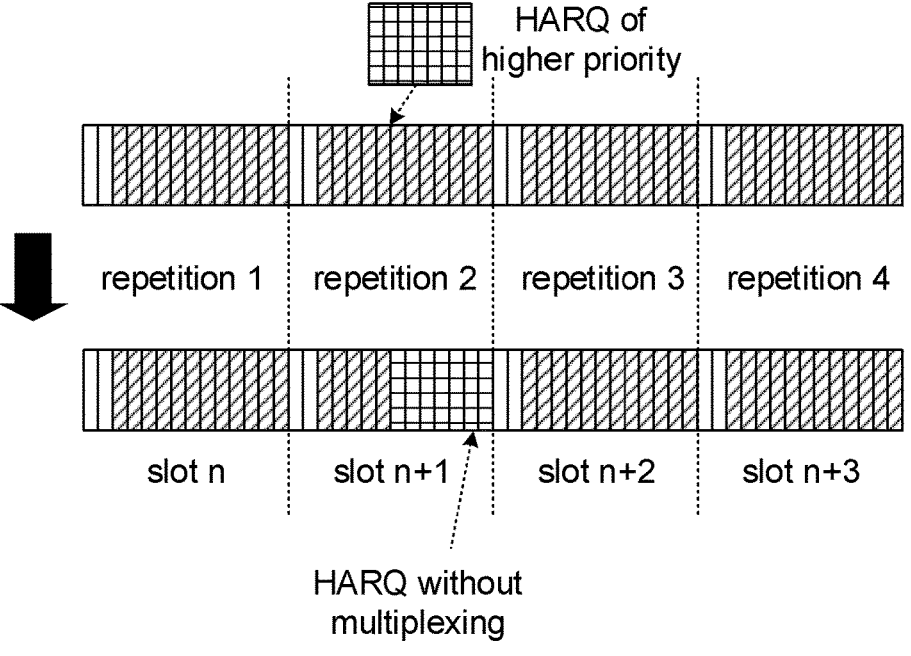

HARQ of higher priority repetition 1    repetition 2    repetition 3    repetition 4 slot n    slot n+1    slot n+2    slot n+3

HARQ without multiplexing (b) conflict resolving by dropping

PUSCH Repetition    HARQ    multiplexed symbols    Others

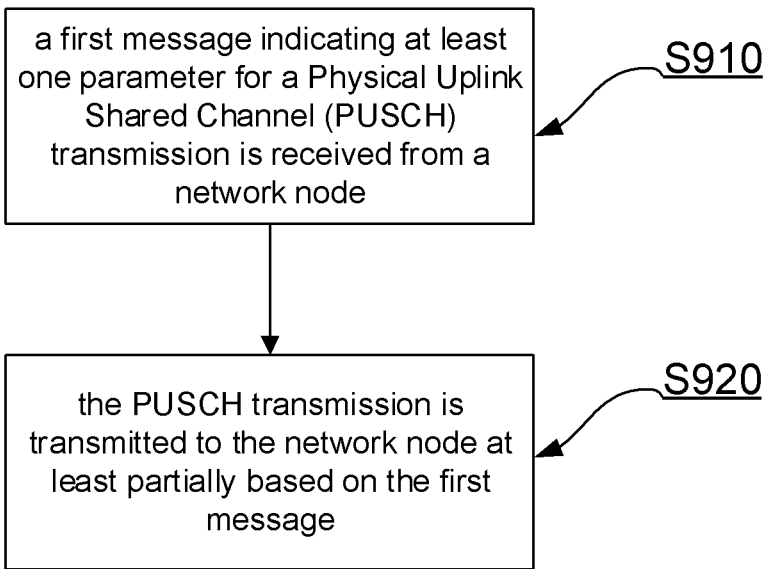

a first message indicating at least one parameter for a Physical Uplink Shared Channel (PUSCH) transmission is received from a network node — S910 the PUSCH transmission is transmitted to the network node at least partially based on the first message — S920

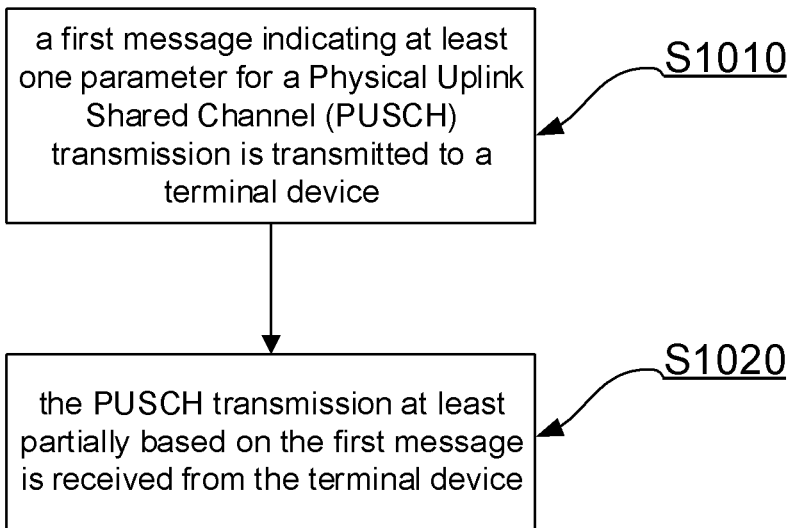

a first message indicating at least one parameter for a Physical Uplink Shared Channel (PUSCH) transmission is transmitted to a terminal device — S1010 the PUSCH transmission at least partially based on the first message is received from the terminal device — S1020

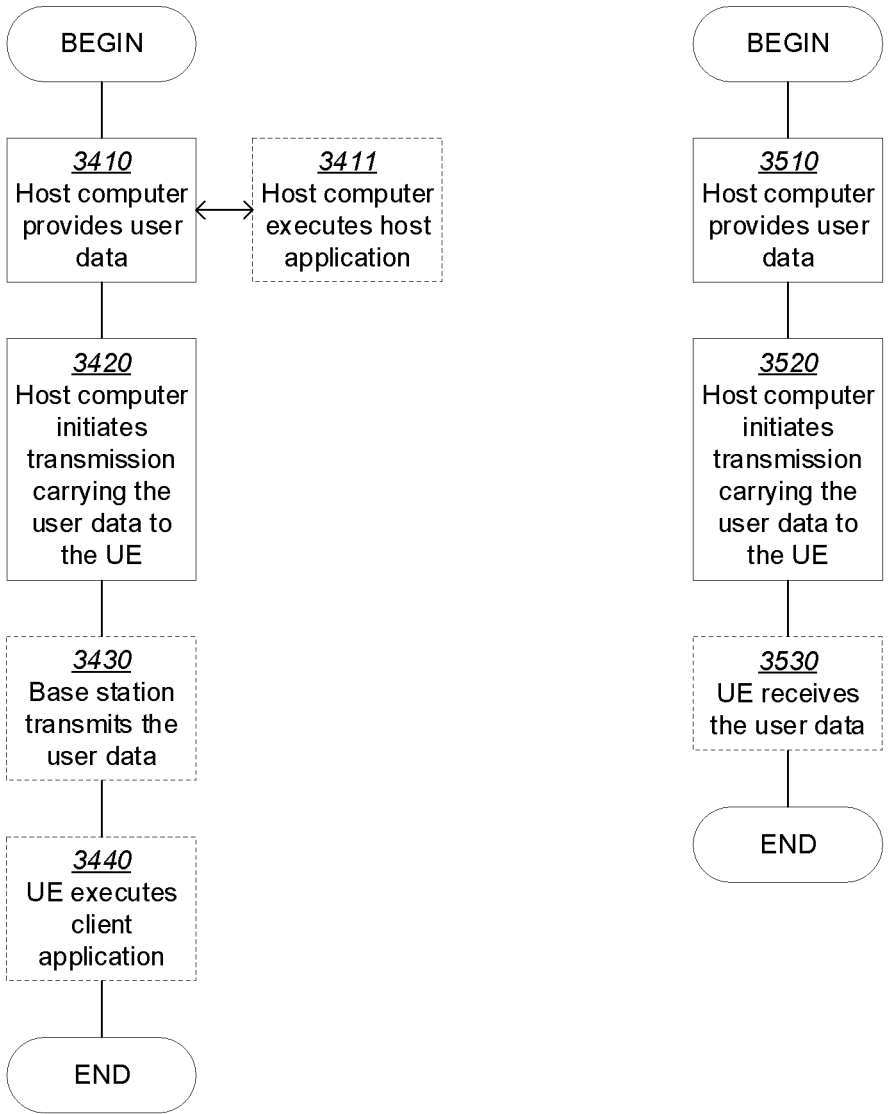
FIG. 14                 FIG. 15

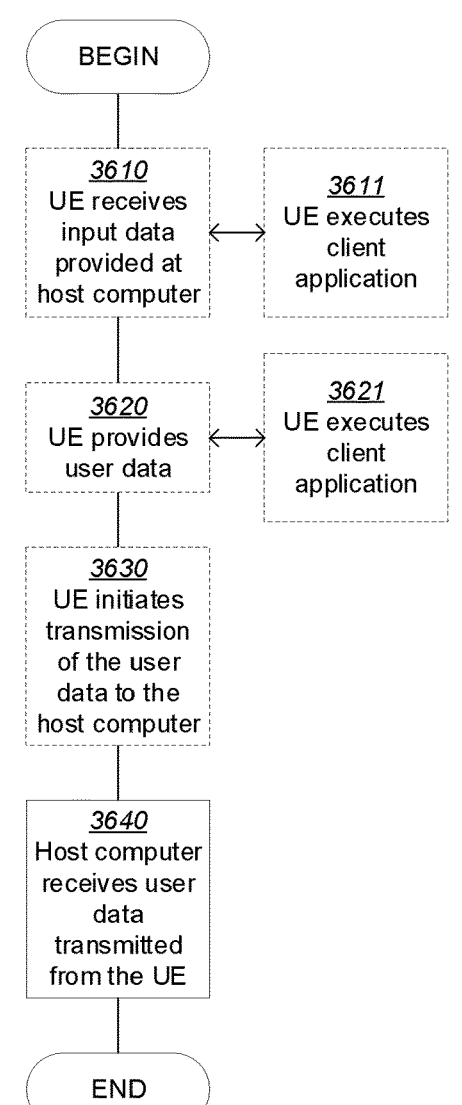
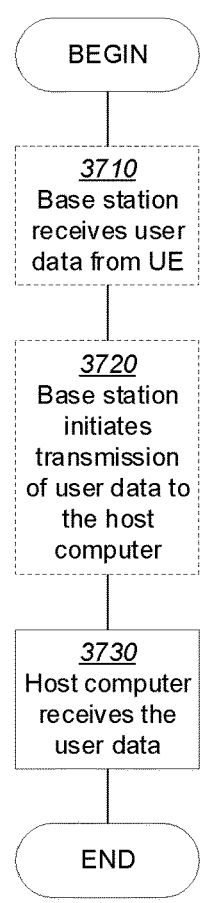
FIG. 16
FIG. 17
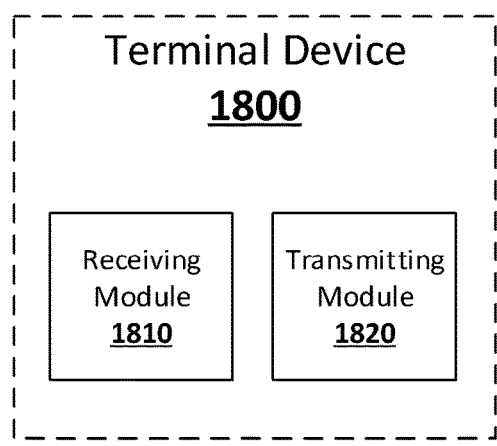
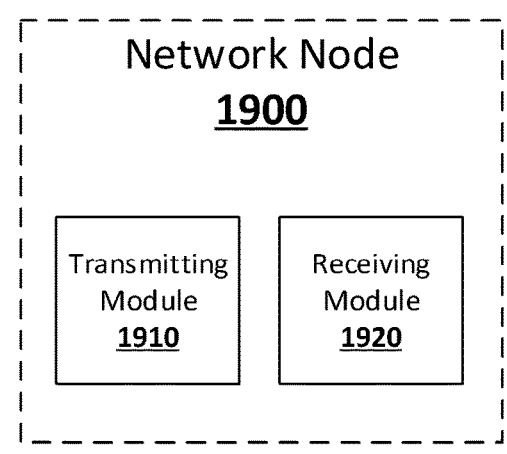
FIG. 18
FIG. 19

ENHANCEMENT FOR UPLINK DATA TRANSMISSION

CROSS-REFERENCE TO RELATED APPLICATION(S)

This application is a 35 U.S.C. § 371 national phase filing of International Application No. PCT/CN2021/123792, filed Oct. 14, 2021, which claims priority to International Application No. PCT/CN2020/121502, filed on Oct. 16, 2020, the disclosures of which are incorporated herein by reference in their entireties.

TECHNICAL FIELD

The present disclosure is related to the field of telecommunication, and in particular, to enhancement for uplink data transmission.

BACKGROUND

With the development of the electronic and telecommunications technologies, mobile devices, such as a mobile phone, a smart phone, a laptop, a tablet, a vehicle mounted device, becomes an important part of our daily lives. To support a numerous number of mobile devices, a highly efficient Radio Access Network (RAN), such as a fifth generation (5G) New Radio (NR) RAN, will be required.

In order to be able to carry the data across the 5G NR RAN, data and information is organized into a number of data channels. By organizing the data into various channels a 5G communications system is able to manage the data transfers in an orderly fashion and the system is able to understand what data is arriving and hence it is able to process it in the required fashion. As there are many different types of data that need to be transferred—user data obviously needs to be transferred, but so does control information to manage the radio communications link, as well as data to provide synchronization, access, and the like. All of these functions are essential and require the transfer of data over the RAN.

In order to group the data to be sent over the 5G NR RAN, the data is organized in a very logical way. As there are many different functions for the data being sent over the radio communications link, they need to be clearly marked and have defined positions and formats. To ensure this happens, there are several different forms of data "channel" that are used. The higher level ones are "mapped" or contained within others until finally at the physical level, the channel contains data from higher level channels. In this way there is a logical and manageable flow of data from the higher levels of the protocol stack down to the physical layer.

There are three main types of data channels that are used for a 5G RAN, and accordingly the hierarchy is given below.

Logical channel: Logical channels can be one of two groups: control channels and traffic channels:

Control channels: The control channels are used for the transfer of data from the control plane; and Traffic channels: The traffic logical channels are used for the transfer of user plane data.

Transport channel: Is the multiplexing of the logical data to be transported by the physical layer and its channels over the radio interface.

Physical channel: The physical channels are those which are closest to the actual transmission of the data over the radio access network/5G RF signal. They are used to carry the data over the radio interface.

The physical channels often have higher level channels mapped onto them for providing a specific service. Additionally, the physical channels carry payload data or details of specific data transmission characteristics like modulation, reference signal multiplexing, transmit power, RF resources, etc.

The 5G physical channels are used to transport information over the actual radio interface. They have the transport channels mapped into them, but they also include various physical layer data required for the maintenance and optimization of the radio communications link between a user equipment (UE) and a base station (BS).

There are three physical channels for each of the uplink and downlink: Physical Downlink Shared Channel (PDSCH), Physical Downlink Control Channel (PDCCH), and Physical Broadcast Channel (PBCH) for downlink, and Physical Random Access Channel (PRACH), Physical Uplink Shared Channel (PUSCH), and Physical Uplink Control Channel (PUCCH) for uplink.

SUMMARY

According to a first aspect of the present disclosure, a method at a terminal device is provided. The method comprises: receiving, from a network node, a first message indicating at least one parameter for a Physical Uplink Shared Channel (PUSCH) transmission; and transmitting, to the network node, the PUSCH transmission at least partially based on the first message.

In some embodiments, the first message indicates a parameter of the PUSCH transmission in time domain. In some embodiments, the first message indicates a number of repetitions for the PUSCH transmission. In some embodiments, the number is greater than 16. In some embodiments, the number is different from any of 1, 2, 3, 4, 7, 8, 12, and 16. In some embodiments, the parameter has more than 8 candidate values and no more than 16 candidate values.

In some embodiments, during the step of transmitting, to the network node, the PUSCH transmission at least partially based on the first message, the method further comprises: receiving, from the network node, a second message indicating that the PUSCH transmission is successfully decoded at the network node before the transmission of all the repetitions for the PUSCH transmission is completed; and prohibiting or skipping the transmission of the remaining repetitions. In some embodiments, the first message is a first Physical Downlink Control Channel (PDCCH) message carrying Downlink Control Information (DCI) with a format for uplink (UL) grant, the second message is a second PDCCH message carrying DCI. In some embodiments, the second message is a DCI format 0_0, DCI format 0_1, or DCI format 0_2 PDCCH message having its Cyclic Redundancy Check (CRC) scrambled with the terminal device's Cell-Radio Network Temporary Identifier (C-RNTI), and the second message comprises a DCI field which is defined as a bitmap, wherein the bitmap indicates successful decoding of the PUSCH transmission which is transmitted with one of a group of Hybrid Automatic Repeat Request (HARQ) process numbers, the group being associated with at least one bit of the bitmap. In some embodiments, the grouping of HARQ process numbers is predefined, semi-persistently configured via previous Radio Resource Control (RRC) signaling, or dynamically configured via the second message.

In some embodiments, the second message is a DCI format 0_0, DCI format 0_1, or DCI format 0_2 PDCCH message having its Cyclic Redundancy Check (CRC)

scrambled with a dedicated Radio Network Temporary Identifier (RNTI), which is previously assigned by the network node to the terminal device and different from the terminal device's Cell-RNTI (C-RNTI), and the second message has the CRC scrambled with the dedicated RNTI which indicates successful decoding of the PUSCH transmission. In some embodiments, the second message is a DCI format 0_0, DCI format 0_1, or DCI format 0_2 PDCCH message, and the second message comprises a first Hybrid Automatic Repeat Request (HARQ) process number which indicates successful decoding of the PUSCH transmission that is transmitted with a second HARQ process number different from and associated with the first HARQ process number. In some embodiments, the second message is a DCI format 0_0, DCI format 0_1, or DCI format 0_2 PDCCH message, and the second message comprises a toggled New Data Indicator (NDI) field which indicates successful decoding of the PUSCH transmission of a same HARQ process number.

In some embodiments, the first message is a Physical Downlink Shared Channel (PDSCH) message carrying a Radio Resource Control (RRC) configured UL grant for the terminal device, the second message is a PDCCH message carrying DCI. In some embodiments, the second message is a DCI format 0_0, DCI format 0_1, or DCI format 0_2 PDCCH message having its Cyclic Redundancy Check (CRC) scrambled with the terminal device's Configured Scheduling-Radio Network Temporary Identifier (CS-RNTI), and at least one HARQ process number is comprised in the second message. In some embodiments, the second message has a DCI state which indicates successful decoding of the PUSCH transmission when the RRC configured UL grant is a Type 1 configured grant. In some embodiments, the DCI state is that the NDI field of the second message has a value of 0. In some embodiments, the second message has a payload which indicates successful decoding of the PUSCH transmission when the RRC configured UL grant is a Type 2 configured grant. In some embodiments, the second message is a DCI format 0_0, DCI format 0_1, or DCI format 0_2 PDCCH message having its Cyclic Redundancy Check (CRC) scrambled with the terminal device's Configured Scheduling-Radio Network Temporary Identifier (CS-RNTI), and the second message comprises an extended NDI field which comprises more than one bit, wherein at least one of values of the extended NDI field indicates successful decoding of the PUSCH transmission. In some embodiments, the second message is a DCI format 0_0, DCI format 0_1, or DCI format 0_2 PDCCH message having its Cyclic Redundancy Check (CRC) scrambled with the terminal device's Configured Scheduling-Radio Network Temporary Identifier (CS-RNTI) or C-RNTI, and the second message has a field which indicates successful decoding of the PUSCH transmission.

In some embodiments, the first message is a first Physical Downlink Shared Channel (PDSCH) message carrying a first Radio Resource Control (RRC) configured UL grant for the terminal device, the first RRC configured UL grant comprising a first HARQ process number, wherein the second message is a second PDCCH message carrying DCI for the terminal device, the second DCI comprising a second HARQ process number which is different from the first HARQ process number and indicates successful decoding of the PUSCH transmission which is transmitted with the first HARQ process number.

In some embodiments, the second message further indicates at least one of: the number of repetitions of the PUSCH transmission which has been received by the network node; and the number of repetitions of the PUSCH transmission which can be omitted.

In some embodiments, the step of prohibiting the transmission of the remaining repetitions comprises: when time division duplex (TDD) mode is used, stopping the PUSCH transmission at a temporal location as follows:

$$S_{stop} = S_{PDCCH} + d_{delay} + d_{offset}$$

where $S_{stop}$ refers to the temporal location where the PUSCH transmission is stopped, $S_{PDCCH}$ refers to the temporal location where the last symbol of the second message is received, $d_{delay}$ refers to processing delay for the second message, and $d_{offset}$ refers to an offset value for error tolerance.

In some embodiments, the step of prohibiting the transmission of the remaining repetitions comprises: when time division duplex (TDD) mode is used, stopping the PUSCH transmission at a temporal location as follows:

$$S_{stop} = S_{PDCCH} + d_{max}$$

where $S_{stop}$ refers to the temporal location where the PUSCH transmission is stopped, $S_{PDCCH}$ refers to the temporal location where the last symbol of the second message is received, and $d_{max}$ refers to a maximum separation between $S_{stop}$ and $S_{PDCCH}$.

In some embodiments, the step of prohibiting the transmission of the remaining repetitions comprises: when frequency division duplex (FDD) mode is used, stopping the PUSCH transmission from the first symbol in PUSCH slot $S_{stop}$, which corresponds to the PDCCH slot $S_{PDCCH}$, in which the last symbol of the second message is received, plus X which refers to a configured or fixed number of PDCCH slots during which the second message is processed. In some embodiments, each of $d_{offset}$, $d_{max}$, and X is variable based on subcarrier space (SCS). In some embodiments, whether UL SCS or DL SCS is used for determining $d_{offset}$, $d_{max}$, and/or X is either RRC/L1 configured or fixed to be either UL SCS or DL SCS.

In some embodiments, the step of transmitting, to the network node, the PUSCH transmission at least partially based on the first message comprises: transmitting, to the network node, a repetition of the PUSCH transmission which is segmented around one or more invalid symbols which are scheduled to be transmitted or received simultaneously with the repetition. In some embodiments, when the repetitions of the PUSCH transmission are type A repetitions, the invalid symbols comprise at least one of: a downlink (DL) symbol; a symbol of Uplink Control Information (UCI) which fails timeline check and cannot be multiplexed with the repetition; a symbol of another PUCCH or PUSCH transmission with a higher PHY priority than that of the repetition; and a symbol for which its corresponding higher layer parameter InvalidSymbolPattern has a value of 1. In some embodiments, when the repetitions of the PUSCH transmission are type B repetitions, the invalid symbols comprise at least one of: a symbol of Uplink Control Information (UCI) which fails timeline check and cannot be multiplexed with the repetition; and a symbol of another PUCCH or PUSCH transmission with a higher PHY priority than that of the repetition. In some embodiments, a segmented part of the repetition which is overlapped with the one or more invalid symbols is transmitted in a manner such that the segmented part is multiplexed with the one or more invalid symbols when the repetition has a same PHY layer priority as that of the one or more invalid symbols.

In some embodiments, before the step of transmitting, to the network node, the PUSCH transmission at least partially based on the first message, the method further comprises: measuring downlink channel quality and/or determining uplink transmit power; and determining whether the terminal device is in good or poor coverage at least partially based on the measured downlink channel quality and/or the determined uplink transmit power. In some embodiments, the method further comprises: receiving, from the network node, a threshold; and wherein the step of determining whether the terminal device is in good or poor coverage at least partially based on the measured downlink channel quality and/or the determined uplink transmit power comprises: determining whether the terminal device is in good or poor coverage by comparing the measured downlink channel quality and/or the determined uplink transmit power with the threshold. In some embodiments, the method further comprises: transmitting, to the network node, a third message indicating whether the terminal device is in good or poor coverage. In some embodiments, when the transmission of the third message occurs before the reception of the first message, the first message configures a parameter indicating a number of repetitions for the PUSCH transmission, and the first message is determined at least partially based on the third message.

In some embodiments, before the step of transmitting, to the network node, the PUSCH transmission at least partially based on the first message, the method further comprises: measuring downlink channel quality; and determining a number of repetitions for the PUSCH transmission at least partially based on the measured downlink channel quality. In some embodiments, the number of repetitions for the PUSCH transmission is determined at least partially based on at least one of:—the number of repetitions needed for downlink transmission;—one or more compensation factors for channel reciprocity, and—the maximum configured repetition number by network. In some embodiments, the one or more compensation factors comprise at least one of:— TDD configuration comprising number of available UL subframes and/or DL/UL subframe ratio;—Transmit power difference between terminal device's transmit power and the network node's transmit power; and—UL/DL Modulation & Coding Scheme (MCS), beamforming gain, and/or antenna gain. In some embodiments, the number of repetitions for the PUSCH transmission is determined from multiple candidate numbers configured by the network node, the multiple candidate numbers comprising the maximum configured repetition number.

In some embodiments, after the step of determining the number of repetitions, the method further comprises transmitting, to the network node, the determined repetition number to indicate at least one of:—a number of repetitions needed for the PUSCH transmission by the terminal device when the transmission of the determined number occurs before the reception of the first message;—a number of repetitions to be transmitted for the PUSCH transmission by the terminal device when the transmission of the determined number occurs after the reception of the first message and before the PUSCH transmission; and—a number of repetitions which has been transmitted for the PUSCH transmission by the terminal device when the transmission of the determined number occurs after the transmission of the determined number of repetitions for the PUSCH transmission. In some embodiments, when the determined number of repetitions is greater than the maximum configured repetition number, the method further comprises: transmitting, to the network node, the maximum configured repetitions. In some embodiments, the method further comprises: receiving, from the network node, a UL grant for retransmission of the PUSCH transmission; and transmitting, to the network node, the retransmission of the PUSCH transmission. In some embodiments, the UL grant for retransmission is determined at least partially based on the determined repetition number. In some embodiments, the reception of the UL grant for retransmission occurs before the transmission of all of the maximum configured repetitions.

In some embodiments, the first message indicates a parameter of the PUSCH transmission in frequency domain. In some embodiments, the first message indicates a frequency hopping configuration. In some embodiments, the frequency hopping configuration further comprises at least one of:—at least a number of hops, the number being greater than 2;—frequency hopping offsets or frequency hopping offset list; and—duration of a hop.

In some embodiments, the first message indicates multiple different frequency hopping configurations, wherein the PUSCH transmission is transmitted with multiple repetitions, and at least two of the multiple repetitions are transmitted with the different frequency hopping configurations, respectively. In some embodiments, the starting resource block (RB) of a hop is determined at least partially based on the start RB of a first or a predetermined hop and/or the frequency hop ID of the hop. In some embodiments, the starting RB of a hop n is defined as follows:

$$RB_{start}(n) = (RB_{start}(0) + n * RB_{offset}) \bmod N_{BWP}^{size}, n = 0, 1, \ldots, N - 1$$

where $RB_{start}(n)$ refers to the starting RB of the hop n, $RB_{start}(0)$ refers to the starting RB of the hop 0, N is the total number of frequency hops, $$N_{BWP}^{size}$$

is the size of the active uplink Bandwidth Part (BWP) in which the PUSCH transmission is transmitted.

In some embodiments, when the calculated starting RB of the hop n and the number of allocated RBs for the terminal device cause the ending RB of the hop n to exceed BWP boundary, the starting RB of the hop n is changed such that the last RB of the hop n is the last RB of the BWP or the starting RB of the hop n is set as the first RB of the BWP. In some embodiments, when the calculated starting RB of the hop n and the number of allocated RBs for the terminal device cause the ending RB of the hop n to exceed BWP boundary, the first message further indicates consecutive RBs which are allocated to be used for terminal device's frequency hopping.

In some embodiments, the first message indicates a parameter of the PUSCH transmission in spatial domain. In some embodiments, the first message further indicates whether transmit diversity is to be used for the PUSCH transmission.

According to a second aspect of the present disclosure, a terminal device is provided. The terminal device comprises: a processor; and a memory storing instructions which, when executed by the processor, cause the processor to perform the any of the methods of the first aspect.

According to a third aspect of the present disclosure, a method at a network node is provided. The method comprises: transmitting, to a terminal device, a first message indicating at least one parameter for a Physical Uplink Shared Channel (PUSCH) transmission; and receiving, from the terminal device, the PUSCH transmission at least partially based on the first message.

In some embodiments, the first message indicates a parameter of the PUSCH transmission in time domain. In some embodiments, the first message indicates a first number of repetitions for the PUSCH transmission. In some embodiments, the first number is greater than 16. In some embodiments, the first number is different from any of 1, 2, 3, 4, 7, 8, 12, and 16. In some embodiments, the parameter has more than 8 candidate values and no more than 16 candidate values.

In some embodiments, the step of receiving, from the terminal device, the PUSCH transmission at least partially based on the first message comprises: receiving the PUSCH transmission with a second number of repetitions, the second number being less than the first number, wherein the method further comprises: transmitting, to the terminal device, a second message indicating that the PUSCH transmission is successfully decoded at the network node in response to determining that the PUSCH transmission is successfully decoded with the received second number of repetitions.

In some embodiments, the first message is a first Physical Downlink Control Channel (PDCCH) message carrying Downlink Control Information (DCI) with a format for uplink (UL) grant, the second message is a second PDCCH message carrying DCI. In some embodiments, the second message is a DCI format 0_0, DCI format 0_1, or DCI format 0_2 PDCCH message having its Cyclic Redundancy Check (CRC) scrambled with the terminal device's Cell-Radio Network Temporary Identifier (C-RNTI), and the second message comprises a DCI field which is defined as a bitmap, wherein the bitmap indicates successful decoding of the PUSCH transmission which is transmitted with one of a group of Hybrid Automatic Repeat Request (HARQ) process numbers, the group being associated with at least one bit of the bitmap. In some embodiments, the grouping of HARQ process numbers is predefined, semi-persistently configured via previous Radio Resource Control (RRC) signaling, or dynamically configured via the second message.

In some embodiments, the second message is a DCI format 0_0, DCI format 0_1, or a DCI format 0_2 PDCCH message having its Cyclic Redundancy Check (CRC) scrambled with a dedicated Radio Network Temporary Identifier (RNTI), which is previously assigned by the network node to the terminal device and different from the terminal device's Cell-RNTI (C-RNTI), and the second message has the CRC scrambled with the dedicated RNTI which indicates successful decoding of the PUSCH transmission. In some embodiments, the second message is a DCI format 0_0, DCI format 0_1, or DCI format 0_2 PDCCH message, and the second message comprises a first Hybrid Automatic Repeat Request (HARQ) process number which indicates successful decoding of the PUSCH transmission that is transmitted with a second HARQ process number different from and associated with the first HARQ process number. In some embodiments, the second message is a DCI format 0_0, DCI format 0_1, or DCI format 0_2 PDCCH message, and the second message comprises a toggled New Data Indicator (NDI) field which indicates successful decoding of the PUSCH transmission of a same HARQ process number. In some embodiments, the first message is a Physical Downlink Shared Channel (PDSCH) message carrying a Radio Resource Control (RRC) configured UL grant for the terminal device, the second message is a PDCCH message carrying DCI. In some embodiments, the second message is a DCI format 0_0, DCI format 0_1, or DCI format 0_2 PDCCH message having its Cyclic Redundancy Check (CRC) scrambled with the terminal device's Configured Scheduling-Radio Network Temporary Identifier (CS-RNTI), and at least one HARQ process number is comprised in the second message. In some embodiments, the second message has a DCI state which indicates successful decoding of the PUSCH transmission when the RRC configured UL grant is a Type 1 configured grant. In some embodiments, the DCI state is that the NDI field of the second message has a value of 0.

In some embodiments, the second message has a payload which indicates successful decoding of the PUSCH transmission when the RRC configured UL grant is a Type 2 configured grant. In some embodiments, the second message is a DCI format 0_0, DCI format 0_1, or DCI format 0_2 PDCCH message having its Cyclic Redundancy Check (CRC) scrambled with the terminal device's Configured Scheduling-Radio Network Temporary Identifier (CS-RNTI), and the second message comprises an extended NDI field which comprises more than one bit, wherein at least one of values of the extended NDI field indicates successful decoding of the PUSCH transmission.

In some embodiments, the second message is a DCI format 0_0, DCI format 0_1 or DCI format 0_2 PDCCH message having its Cyclic Redundancy Check (CRC) scrambled with the terminal device's Configured Scheduling-Radio Network Temporary Identifier (CS-RNTI) or C-RNTI, and the second message has a field which indicates successful decoding of the PUSCH transmission. In some embodiments, the first message is a first Physical Downlink Shared Channel (PDSCH) message carrying a first Radio Resource Control (RRC) configured UL grant for the terminal device, the first RRC configured UL grant comprising a first HARQ process number, wherein the second message is a second PDCCH message carrying DCI for the terminal device, the second DCI comprising a second HARQ process number which is different from the first HARQ process number and indicates successful decoding of the PUSCH transmission which is transmitted with the first HARQ process number.

In some embodiments, the second message further indicates at least one of: the number of repetitions of the PUSCH transmission which has been received by the network node; and the number of repetitions of the PUSCH transmission which can be omitted. In some embodiments, the step of receiving, from the terminal device, the PUSCH transmission at least partially based on the first message comprises: receiving, from the terminal device, a repetition of the PUSCH transmission which is segmented around one or more invalid symbols which are scheduled to be transmitted or received simultaneously with the repetition. In some embodiments, when the repetitions of the PUSCH transmission are type A repetitions, the invalid symbols comprise at least one of: a downlink (DL) symbol; a symbol of Uplink Control Information (UCI) which fails timeline check and cannot be multiplexed with the repetition; a symbol of another PUCCH or PUSCH transmission with a higher PHY priority than that of the repetition; and a symbol for which its corresponding higher layer parameter InvalidSymbolPattern has a value of 1. In some embodiments, when the repetitions of the PUSCH transmission are type B repetitions, the invalid symbols comprise at least one of: a symbol of Uplink Control Information (UCI) which fails timeline check and cannot be multiplexed with the repetition; and a symbol of another PUCCH or PUSCH transmission with a higher PHY priority than that of the repetition.

In some embodiments, a segmented part of the repetition which is overlapped with the one or more invalid symbols is transmitted in a manner such that the segmented part is multiplexed with the one or more invalid symbols when the repetition has a same PHY layer priority as that of the one or more invalid symbols. In some embodiments, the method further comprises: transmitting, to the terminal device, a threshold for determining whether the terminal device is in good or poor coverage.

In some embodiments, before the step of receiving, from the terminal device, the PUSCH transmission at least partially based on the first message, the method further comprises: receiving, from the terminal device, a third message indicating whether the terminal device is in good or poor coverage. In some embodiments, when the reception of the third message occurs before the transmission of the first message, the method further comprises: determining the first message at least partially based on the third message before the transmission of the first message.

In some embodiments, the first message configures a parameter indicating the maximum number of repetitions which can be transmitted for the PUSCH transmission. In some embodiments, the first message configures a parameter indicating multiple candidate numbers of repetitions, comprising the maximum number of repetitions, which can be transmitted for the PUSCH transmission. In some embodiments, the method further comprises: receiving, from the terminal device, a determined repetition number to indicate at least one of:—a number of repetitions needed for the PUSCH transmission by the terminal device when the reception of the determined number occurs before the transmission of the first message;—a number of repetitions to be received for the PUSCH transmission by the network node when the reception of the determined number occurs after the transmission of the first message and before the PUSCH transmission; and—a number of repetitions which has been received for the PUSCH transmission by the network node when the reception of the determined number occurs after the reception of the determined number of repetitions for the PUSCH transmission.

In some embodiments, the method further comprises: transmitting, to the terminal device, a UL grant for retransmission of the PUSCH transmission; and receiving, from the terminal device, the retransmission of the PUSCH transmission. In some embodiments, the UL grant for retransmission is determined at least partially based on the determined repetition number. In some embodiments, the transmission of the UL grant for retransmission occurs before the reception of all of the maximum configured repetitions. In some embodiments, the first message indicates a parameter of the PUSCH transmission in frequency domain. In some embodiments, the first message indicates a frequency hopping configuration. In some embodiments, the frequency hopping configuration further comprises at least one of:—at least a number of hops, the number being greater than 2;—frequency hopping offsets or frequency hopping offset list; and—duration of a hop.

In some embodiments, the first message indicates multiple different frequency hopping configurations, wherein the PUSCH transmission is received with multiple repetitions, and at least two of the multiple repetitions are received with the different frequency hopping configurations, respectively. In some embodiments, the starting resource block (RB) of a hop is determined at least partially based on the start RB of a first or a predetermined hop and/or the frequency hop ID of the hop. In some embodiments, the starting RB of a hop n is defined as follows:

$$RB_{start}(n) = (RB_{start}(0) + n * RB_{offset}) \bmod N_{BWP}^{size}, n = 0, 1, \ldots, N-1$$

where $RB_{start}(n)$ refers to the starting RB of the hop n, $RB_{start}(0)$ refers to the starting RB of the hop 0, N is the total number of frequency hops, $$N_{BWP}^{size}$$

is the size of the active uplink Bandwidth Part (BWP) in which the PUSCH transmission is transmitted.

In some embodiments, when the calculated starting RB of the hop n and the number of allocated RBs for the terminal device cause the ending RB of the hop n to exceed BWP boundary, the starting RB of the hop n is changed such that the last RB of the hop n is the last RB of the BWP or the starting RB of the hop n is set as the first RB of the BWP. In some embodiments, when the calculated starting RB of the hop n and the number of allocated RBs for the terminal device cause the ending RB of the hop n to exceed BWP boundary, the first message further indicate consecutive RBs which are allocated to be used for terminal device's frequency hopping.

In some embodiments, the first message indicates a parameter of the PUSCH transmission in spatial domain. In some embodiments, the first message indicates whether transmit diversity is to be used at the terminal device for the PUSCH transmission. In some embodiments, the method further comprises: performing IQ combining and/or soft combining on the received repetitions of the PUSCH transmission when the first message indicates that the transmit diversity is not to be used at the terminal device for the received repetitions for the PUSCH transmission; and performing soft combining alone on the received repetitions of the PUSCH transmission when the sixth indicator indicates that the transmit diversity is to be used at the terminal device for the received repetitions for the PUSCH transmission. In some embodiments, the method further comprises: performing IQ combining and/or soft combining on the received repetitions of the PUSCH transmission in response to determining that the received repetitions are received in a same hop or when frequency hopping is not enabled; and performing soft combining alone on the received repetitions of the PUSCH transmission in response to determining that the received repetitions are received in different hops. In some embodiments, the method further comprises: performing IQ combining and/or soft combining on the received repetitions of the PUSCH transmission in response to determining that the received repetitions are received in a same hop or different hops with a frequency gap less than or equal to a predetermined threshold or when frequency hopping is not enabled; and performing soft combining alone on the received repetitions of the PUSCH transmission in response to determining that the received repetitions are received in different hops with a frequency gap greater than the predetermined threshold.

According to a fourth aspect of the present disclosure, a network node is provided. The network node comprises: a processor; and a memory storing instructions which, when executed by the processor, cause the processor to perform any of the methods of the third aspect.

According to a fifth aspect of the present disclosure, a terminal device is provided. The terminal device comprises: a receiving module configured to receive, from a network node, a first message indicating at least one parameter for a Physical Uplink Shared Channel (PUSCH) transmission; and a transmitting module configured to transmit, to the network node, the PUSCH transmission at least partially based on the first message.

According to a sixth aspect of the present disclosure, a network node is provided. The network node comprises: a transmitting module configured to transmit, to a terminal device, a first message indicating at least one parameter for a Physical Uplink Shared Channel (PUSCH) transmission; and a receiving module configured to receive, from the terminal device, the PUSCH transmission at least partially based on the first message.

According to a seventh aspect of the present disclosure, a telecommunications system is provided. The telecommunications system comprises: one or more terminal devices of the second aspect; and at least one network node of the fourth aspect.

According to an eighth aspect of the present disclosure, a computer program comprising instructions which, when executed by at least one processor, cause the at least one processor to carry out any of the methods of the first aspect or the third aspect.

According to a nineth aspect of the present disclosure, a carrier containing the computer program of the sixth aspect is provided, wherein the carrier is one of an electronic signal, optical signal, radio signal, or computer readable storage medium.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

FIG. 2 is a diagram illustrating exemplary protocol stacks with which enhancement for uplink data transmission according to an embodiment of the present disclosure is applicable.

FIG. 3 is a message flow diagram illustrating exemplary procedures for uplink data transmission during which enhancement for uplink data transmission according to an embodiment of the present disclosure is applicable.

FIG. 5 is a diagram illustrating an exemplary slot structure for early termination of uplink data transmission according to an embodiment of the present disclosure.

FIG. 7 is a diagram illustrating an exemplary slot structure for resolving conflict between multiple uplink data transmissions according to an embodiment of the present disclosure.

FIG. 9 is a flow chart illustrating an exemplary method at a terminal device for enhancing uplink data transmission according to an embodiment of the present disclosure.

FIG. 10 is a flow chart illustrating an exemplary method at a network node for enhancing uplink data transmission according to an embodiment of the present disclosure.

FIG. 14 to 17 are flowcharts illustrating methods implemented in a communication system including a host computer, a base station and a user equipment.

FIG. 18 is a block diagram of an exemplary terminal device according to an embodiment of the present disclosure.

FIG. 19 is a block diagram of an exemplary network node according to an embodiment of the present disclosure.

DETAILED DESCRIPTION

Figure 1:
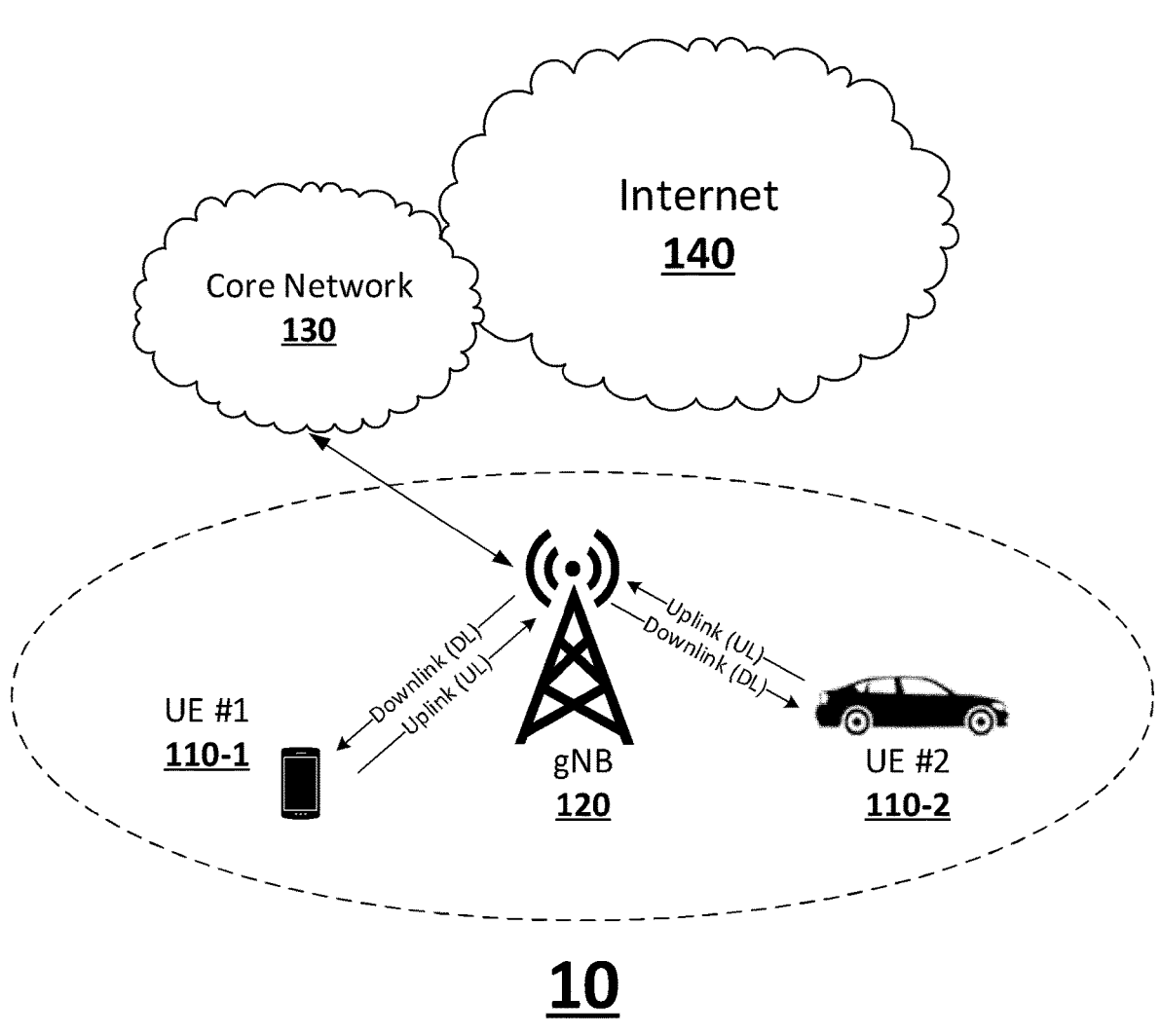
FIG. 1 is an overview diagram illustrating an exemplary 5G New Radio (NR) access network in which enhancement for uplink data transmission according to an embodiment of the present disclosure is applicable.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first", "second", "third", "fourth," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of 5G New Radio (NR), the present disclosure is not limited thereto. In fact, as long as uplink data transmission is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), 4th Generation Long Term Evolution (LTE), LTE-Advance (LTE-A), or 5th Generation New Radio (5G NR), etc. Therefore, one skilled in the arts could readily understand that the terms used herein may also refer to their equivalents in any other infrastructure. For example, the term "User Equipment" or "UE" used herein may refer to a terminal device, a mobile device, a mobile terminal, a mobile station, a user device, a user terminal, a wireless device, a wireless terminal, or any other equivalents. For another example, the term "gNB" used herein may refer to a network node, a base station, a base transceiver station, an access point, a hot spot, a NodeB, an Evolved NodeB, a network element, or any other equivalents. Further, please note that the term "indicator" used herein may refer to an attribute, a setting, a configuration, a profile, an identifier, a field, one or more bits/octets, or any data by which information of interest may be indicated directly or indirectly.

Further, following 3GPP documents are incorporated herein by reference in their entireties:

3GPP TS 38.211 V16.3.0 (2020-09), 3rd Generation Partnership Project; Technical Specification Group Radio Access Network; NR; Physical channels and modulation (Release 16);

3GPP TS 38.213 V16.3.0 (2020-09), 3rd Generation Partnership Project; Technical Specification Group Radio Access Network; NR; Physical layer procedures for control (Release 16);

3GPP TS 38.214 V16.3.0 (2020-09), 3rd Generation Partnership Project; Technical Specification Group Radio Access Network; NR; Physical layer procedures for data (Release 16);

3GPP TS 38.321 V16.2.1 (2020-09), 3rd Generation Partnership Project; Technical Specification Group Radio Access Network; NR; Medium Access Control (MAC) protocol specification (Release 16); and 3GPP TS 38.331 V16.2.0 (2020-09), 3rd Generation Partnership Project; Technical Specification Group Radio Access Network; NR; Radio Resource Control (RRC) protocol specification (Release 16).

According to the studies of the 5G coverage, when a UE is in RRC connected state, its PUSCH transmission has been identified as one of bottlenecks of cell coverage. With the popularity of short video applications (e.g. TicTok), or Internet of Things (IoT) devices (e.g. sensors mounted on an autonomous vehicle) which may generate mass data to be transmitted via uplink, the problem of uplink data transmission efficiency has become more serious. Therefore, enhancement for uplink data transmission is required.

As mentioned above, enhancement for uplink data transmission is required. Some embodiments for enhancing uplink data transmission will be described below in the context of 5G NR. However, the present disclosure is not limited thereto, and the inventive concepts herein will also be applicable to other communication network architectures.

Before the description of the embodiments, a brief introduction of uplink data transmission in 5G NR will be given.

NR Rel. 15

Slot aggregation for PUSCH is supported in 3GPP TS Rel-15 and renamed to PUSCH Repetition Type A in 3GPP TS Rel-16. The name PUSCH repetition Type A is used even if there is only a single repetition, i.e. no slot aggregation. In Rel. 15, a PUSCH transmission that overlaps with DL symbols is not transmitted.

For DCI granted multi-slot transmission (PDSCH/PUSCH) verses semi-static (or semi-persistent) DL/UL assignment, if a semi-static DL/UL assignment configuration of a slot has no direction confliction with scheduled PDSCH/PUSCH assigned symbols, the PDSCH/PUSCH in that slot is received/transmitted. However, if the semi-static DL/UL assignment configuration of a slot has direction confliction with the scheduled PDSCH/PUSCH assigned symbols, the PDSCH/PUSCH transmission in that slot is not received/transmitted, i.e. the effective number of repetitions reduces.

Further, in Rel. 15, the number of repetitions is semi-statically configured by RRC parameter pusch-Aggregation-Factor. According to the Rel. 15 specification, at most 8 repetitions are supported:

pusch-AggregationFactor ENUMERATED {n2, n4, n8}

Further, early termination of PUSCH repetitions was discussed in Rel. 14 NR SI in RAN1 #88 with below agreement, but not standardized finally.

R1-1703868: WF on grant-free repetitions, Huawei, HiSilicon, Nokia, ABS, ZTE, ZTE Microelectronics, CATT, Convida Wireless, CATR, OPPO, Inter Digital, Fujitsu Agreements:

For UE configured with K repetitions for a transport block (TB) transmission with/without grant, the UE can continue repetitions (FFS can be different RV versions, FFS different MCS) for the TB until one of the following conditions is met If an UL grant is successfully received for a slot/mini-slot for the same TB FFS: How to determine the grant is for the same TB FFS: An acknowledgement/indication of successful receiving of that TB from gNB The number of repetitions for that TB reaches K FFS: Whether it is possible to determine if the grant is for the same TB Note that this does not assume that UL grant is scheduled based on the slot whereas grant free allocation is based on mini-slot (vice versa)

Note that other termination condition of repetition may apply

NR Rel-16

A new repetition format PUSCH repetition Type B is supported in Rel-16, which PUSCH repetition allows back-to-back repetition of PUSCH transmissions. The biggest difference between the two types, i.e. Type A and Type B, is that repetition Type A only allows a single repetition in each slot, with each repetition occupying the same symbols.

Using this format with a PUSCH length shorter than 14 introduces gaps between repetitions, increasing the overall latency. The other change compared to Rel. 15 is how the number of repetitions is signaled. In Rel. 15, the number of repetitions is semi-statically configured, while in Rel. 16 the number of repetitions can be indicated dynamically in DCI. This applies both to dynamic grants and type 2 configured grants.

In NR R16, invalid symbols for PUSCH repetition Type B include reserved UL resources. The invalid symbol pattern indicator field is configured in the scheduling DCI.

Segmentation occurs around symbols that are indicated as DL by the semi-static TDD pattern and invalid symbols.

Below shows the signaling of number of repetitions.

From 38.214 V16.3.0:

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as if numberOfRepetitions-r16 is present in the resource allocation table, the number of repetitions K is equal to numberOfRepetitions-r16;

elseif the UE is configured with pusch-AggregationFactor, the number of repetitions K is equal to pusch-AggregationFactor;

otherwise K=1.

Format DCI 0_1 in 38.212 V16.3.0:

Time domain resource assignment—0, 1, 2, 3, 4, 5, or 6 bits

If the higher layer parameter PUSCH-TimeDomainResourceAllocationList-ForDCIformat0_1 is not configured and if the higher layer parameter pusch-TimeDomainA/locationListForMultiPUSCH is not configured and if the higher layer parameter pusch-TimeDomainAilocationListis configured, 0, 1, 2, 3, or 4 bits as defined in Clause 6.1.2.1 of [6, TS38.214]. The bit-width for this field is determined as $\lceil\log_2(I)\rceil$ bits, where I is the number of entries in the higher layer parameter pusch-TimeDomainAllocationList, If the higher layer parameter PUSCH-TimeDomainResourceAllocationList-ForDCIformat0_1 is configured or if the higher layer parameter pusch-TimeDomain-AllocationListForMultiPUSCH is configured, 0, 1, 2, 3, 4, 5 or 6 bits as defined in Clause 6.1.2.1 of [6, TS38.214]. The bitwidth for this field is determined as $\lceil\log_2(I)\rceil$ bits, where I is the number of entries in the higher layer parameter PUSCH-TimeDomainResourceAllocationList-ForDCIformat0_1 or pusch-TimeDomainAllocationListForMutiPUSCH;

otherwise the bitwidth for this field is determined as $\lceil\log_2(I)\rceil$ bits, where I is the number of entries in the default table.

From 38.331 V16.3.0:

| PUSCH-Config information element |
| --- |

...
| pusch-TimeDomainAllocationList TimeDomainResourceAllocationList } | SetupRelease { PUSCH-   OPTIONAL, -- Need M |
| pusch-AggregationFactor OPTIONAL, -- Need S | ENUMERATED { n2, n4, n8 } |

...
| pusch-TimeDomainAllocationListDCI-0-2-r16 TimeDomainResourceAllocationList-r16 } OPTIONAL, -- Need M | SetupRelease { PUSCH- |

-continued

| PUSCH-Config information element |
| --- |

```
-- End of the parameters for DCI format 0__2 introduced in V16.1.0
-- Start of the parameters for DCI format 0__1 introduced in V16.1.0
    pusch-TimeDomainAllocationListDCI-0-1-r16           SetupRelease { PUSCH-
TimeDomainResourceAllocationList-r16 }
OPTIONAL, -- Need M
...
```

From 38.331 V16.1.0

| PUSCH-Config information element |
| --- |

```
pusch-TimeDomainAllocationList              SetupRelease { PUSCH-TimeDomainResourceAllocationList }
pusch-AggregationFactor                     ENUMERATED { n2, n4, n8 }
OPTIONAL, -- Need S
pusch-TimeDomainAllocationListForDCI-Format0-1-r16 SetupRelease { PUSCH-
TimeDomainResourceAllocationList-r16 }
pusch-TimeDomainAllocationListForDCI-Format0-2-r16 SetupRelease { PUSCH-
TimeDomainResourceAllocationList-r16 }
```

| PUSCH-TimeDomainResourceAllocation information element |
| --- |

```
-- ASN1START
-- TAG-PUSCH-TIMEDOMAINRESOURCEALLOCATIONLIST-START
PUSCH-TimeDomainResourceAllocationList ::=    SEQUENCE (SIZE(1..maxNrofUL-Allocations)) OF PUSCH-
TimeDomainResourceAllocation
PUSCH-TimeDomainResourceAllocation ::= SEQUENCE {
   k2                                    INTEGER(0..32)
OPTIONAL, -- Need S
     mappingType                         ENUMERATED {typeA, typeB},
     startSymbolAndLength                INTEGER (0..127)
}
PUSCH-TimeDomainResourceAllocationList-r16 ::= SEQUENCE (SIZE(1..maxNrofUL-Allocations-r16)) OF
PUSCH-TimeDomainResourceAllocation-r16
PUSCH-TimeDomainResourceAllocation-r16 ::=    SEQUENCE {
   k2-r16                                   INTEGER (0..32)          OPTIONAL, -- Need S
   puschAllocationList-r16                  SEQUENCE (SIZE(1..maxNrofMultiplePUSCHs-r16)) OF
PUSCH-Allocation-r16,
   ...
}
PUSCH-Allocation-r16 ::= SEQUENCE {
   mappingType-r16                       ENUMERATED {typeA, typeB}
OPTIONAL, -- Cond NotFormat01-02-Or-TypeA
   startSymbolAndLength-r16              INTEGER (0..127)
OPTIONAL, -- Cond NotFormat01-02-Or-TypeA
   startSymbol-r16                       INTEGER (0..13)
OPTIONAL, -- Cond RepTypeB
   length-r16                            INTEGER (1..14)
OPTIONAL, -- Cond RepTypeB
   numberOfRepetitions-r16               ENUMERATED {n1, n2, n3, n4, n7, n8, n12, n16}
OPTIONAL, -- Cond Format01-02
   ...
}
-- TAG-PUSCH-TIMEDOMAINRESOURCEALLOCATIONLIST-STOP
-- ASN1STOP
```

Multiplicity and type constraint definitions

```
...
maxNrofUL-Allocations        INTEGER ::= 16    -- Maximum number
of PUSCH time domain resource allocations.
...
maxNrofUL-Allocations-r16    INTEGER ::= 64    -- Maximum number
of PUSCH time domain resource allocations
...
```

Retransmission of PUSCH with Dynamic Grant in NR Up to Rel-16

Based on 38.321, for PUSCH with dynamic grant, NDI is used to trigger a new transmission if NDI is toggled for the identified HARQ process, otherwise retransmission is triggered with the UL grant.

In 38.321 v16.2.1:

5.4.1 UL Grant Reception

. . .

If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:

---

1>  if an uplink grant for this Serving Cell has been received on the PDCCH for the MAC entity's C-RNTI or Temporary C-RNTI; or
1>  if an uplink grant has been received in a Random Access Response:
    2>  if the uplink grant is for MAC entity's C-RNTI and if the previous uplink grant delivered to the HARQ entity for the same HARQ process was either an uplink grant received for the MAC entity's CS-RNTI or a configured uplink grant:
        3>  consider the NDI to have been toggled for the corresponding HARQ process regardless of the value of the NDI.
    2>  if the uplink grant is for MAC entity's C-RNTI, and the identified HARQ process is configured for a configured uplink grant:
        3>  start or restart the configuredGrantTimer for the correponding HARQ process, if configured.
        3>  stop the cg-RetransmissionTimer for the correponding HARQ process, if running.
    2>  deliver the uplink grant and the associated HARQ information to the HARQ entity.

---

5.4.2.1 HARQ Entity

---

Each HARQ process supports one TB.
Each HARQ process is associated with a HARQ process identifier.
...

---

For each uplink grant, the HARQ entity shall:

---

1>  identify the HARQ process associated with this grant, and for each identified HARQ process:
    2>  if the received grant was not addressed to a Temporary C-RNTI on PDCCH, and the NDI provided in the associated HARQ information has been toggled compared to the value in the previous transmission of this TB of this HARQ process; or
    ...
        3>  else if the MAC entity is not configured with lch-basedPrioritization; or
        3>  if this uplink grant is a prioritized uplink grant:
            4>  obtain the MAC PDU to transmit from the Multiplexing and assembly entity, if any;
        3>  if a MAC PDU to transmit has been obtained:
            4>  if the uplink grant is not a configured grant configured with autonomousTx; or
            4>  if the uplink grant is a prioritized uplink grant:
                5>  deliver the MAC PDU and the uplink grant and the HARQ information of the TB to the identified HARQ process;
                5>  instruct the identified HARQ process to trigger a new transmission;
                ...
        3>  else:
            4>  flush the HARQ buffer of the identified HARQ process.
    2>  else (i.e. retransmission):
    ...
        3>  else:
            4>  deliver the uplink grant and the HARQ information (redundancy version) of the TB to the identified HARQ process;
            4>  instruct the identified HARQ process to trigger a retransmission;
            ...

---

UL Transmission with Configured Grant

Type 1 and type 2 UL transmission with configured grant were supported in Rel-15. Type 1 UL data transmission with configured grant is only based on RRC (re)configuration without any L1 signalling and Type 2 is based on both RRC configuration and L1 signalling for activation/deactivation of the grant. For both types, RNTI(s) is/are configured by UE-specific RRC signalling. Within each type, an RNTI is configured by UE-specific RRC signalling at least for one resource configuration in a serving cell. PUSCH repetition with configured grant was supported. 5G NR supports multiple HARQ processes for UL transmission with configured grant. When an UL grant is used for retransmissions of Type 1 UL transmission with configured grant, a different RNTI from the RNTI for UL transmission with dynamic grant is needed. For Type 2 UL transmission with configured grant, a different RNTI from the RNTI for UL transmission with dynamic grant is needed for activation/deactivation and at least for re-transmission. ACK feedback is implicit and NACK is explicit. A timer T starts when a TB is transmitted, and if no explicit NACK (dynamic grant) is received before the timer expires the UE assumes ACK.

Sub-clauses 5.4.1, 5.4.2, and 5.8.2 in 38.321 v16.2.1:

If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:

---

1>  if an uplink grant for this Serving Cell has been received on the PDCCH for the MAC entity's C-RNTI or Temporary C-RNTI; or
1>  if an uplink grant has been received in a Random Access Response:
    2>  if the uplink grant is for MAC entity's C-RNTI and if the previous uplink grant delivered to the HARQ entity for the same HARQ process was either an uplink grant received for the MAC entity's CS-RNTI or a configured uplink grant:
        3>  consider the NDI to have been toggled for the corresponding HARQ process regardless of the value of the NDI.
    2>  if the uplink grant is for MAC entity's C-RNTI, and the identified HARQ process is configured for a configured uplink grant:
        3>  start or restart the configuredGrantTimer for the correponding HARQ process, if configured.
        3>  stop the cg-RetransmissionTimer for the correponding HARQ process, if running.
    2>  deliver the uplink grant and the associated HARQ information to the HARQ entity.
1>  else if an uplink grant for this PDCCH occasion has been received for this Serving Cell on the PDCCH for the MAC entity's CS-RNTI:
    2>  if the NDI in the received HARQ information is 1:
        3>  consider the NDI for the corresponding HARQ process not to have been toggled;
        3>  start or restart the configuredGrantTimer for the corresponding HARQ process, if configured;
        3>  stop the cg-RetransmissionTimer for the correponding HARQ process, if running;
        3>  deliver the uplink grant and the associated HARQ information to the HARQ entity.
    2>  else if the NDI in the received HARQ information is 0:
        3>  if PDCCH contents indicate configured grant Type 2 deactivation:
            4>  trigger configured uplink grant confirmation.
        3>  else if PDCCH contents indicate configured grant Type 2 activation:
            4>  trigger configured uplink grant confirmation;
            4>  store the uplink grant for this Serving Cell and the associated HARQ information as configured uplink grant;
            4>  initialise or re-initialise the configured uplink grant for this Serving Cell to start in the associated PUSCH duration and to recur according to rules in clause 5.8.2;
            4>  stop the configuredGrantTimer for the corresponding HARQ process, if running;
            4>  stop the cg-RetransmissionTimer for the correponding HARQ process, if running.

---

HARQ Process ID

For configured uplink grants neither configured with harq-Proc-D-Offset2 nor with cg-Retransmission Timer, the HARQ Process ID associated with the first symbol of a UL transmission is derived from the following equation:

$$\text{HARQ Process ID} = [\text{floor}(\text{CURRENT\_symbol}/\text{periodicity})] \bmod \text{nrofHARQ-Processes}$$

For configured uplink grants with harq-Proc-D-Offset2, the HARQ Process ID associated with the first symbol of a UL transmission is derived from the following equation:

$$\text{HARQ Process ID} = [\text{floor}(\text{CURRENT\_symbol}/\text{periodicity})] \bmod \text{nrofHARQ-Processes} + \text{harq-Proc-D-Offset2}$$

where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211 [8].

For configured uplink grants configured with cg-RetransmissionTimer, the UE implementation select an HARQ Process ID among the HARQ process IDs available for the configured grant configuration. The UE shall prioritize retransmissions before initial transmissions. The UE shall toggle the NDI in the CG-UCI for new transmissions and not toggle the NDI in the CG-UCI in retransmissions.

NOTE 1: CURRENT_symbol refers to the symbol index of the first transmission occasion of a repetition bundle that takes place.

NOTE 2: A HARQ process is configured for a configured uplink grant where neither harq-ProcID-Offset nor harq-Proc-D-Offset2 is configured, if the configured uplink grant is activated and the associated HARQ process ID is less than nrofHARQ-Processes. A HARQ process is configured for a configured uplink grant where harq-Proc-D-Offset2 is configured, if the configured uplink grant is activated and the associated HARQ process ID is greater than or equal to harq-Proc-D-Offset2 and less than sum of harq-Proc-D-Offset2 and nrofHARQ-Processes for the configured grant configuration.

NOTE 3: If the MAC entity receives a grant in a Random Access Response (i.e. MAC RAR or fallbackRAR) or determines a grant as specified in clause 5.1.2a for MSGA payload and if the MAC entity also receives an overlapping grant for its C-RNTI or CS-RNTI, requiring concurrent transmissions on the SpCell, the MAC entity may choose to continue with either the grant for its RA-RNTI/MSGB-RNTI/the MSGA payload transmission or the grant for its C-RNTI or CS-RNTI.

NOTE 4: In case of unaligned SFN across carriers in a cell group, the SFN of the concerned Serving Cell is used to calculate the HARQ Process ID used for configured uplink grants.

NOTE 5: If cg-Retransmission Timer is not configured, a HARQ process is not shared between different configured grant configurations in the same BWP.

RRC Configuration for Type1/2 Configured Grant

RRC configures the following parameters when the configured grant Type 1 is configured:
cs-RNTI: CS-RNTI for retransmission;
periodicity: periodicity of the configured grant Type 1;

timeDomainOffset: Offset of a resource with respect to SFN=timeReferenceSFN in time domain;

timeDomainAllocation: Allocation of configured uplink grant in time domain which contains startSymbolAndLength (i.e. SLIV in TS 38.214 [7]) or startSymbol (i.e. S in TS 38.214 [7]);

nrofHARQ-Processes: the number of HARQ processes for configured grant;

. . .

RRC configures the following parameters when the configured grant Type 2 is configured:
cs-RNTI: CS-RNTI for activation, deactivation, and retransmission;
periodicity: periodicity of the configured grant Type 2;
nrofHARQ-Processes: the number of HARQ processes for configured grant;

. . .

RRC configures the following parameters when retransmissions on configured uplink grant is configured:
cg-Retransmission Timer: the duration after a configured grant (re)transmission of a HARQ process when the UE shall not autonomously retransmit that HARQ process.

Retransmissions Except for Repetition of Configured Uplink Grants Use Uplink Grants Addressed to CS-RNTI.

Delay from DCI Scheduling a Higher Priority DG to Cancellation of Ongoing CG-PUSCH Sub-Clause 6.1 in 38.214 v16.1.0:

[If a UE reports the capability of intra-UE prioritization], and if a PUSCH corresponding to a configured grant and a PUSCH scheduled by a PDCCH on a serving cell are partially or fully overlapping in time, If the PUSCH corresponding to the configured grant has priority in configuredGrantConfig set to 1 (i.e., high priority), and the PUSCH scheduled by the PDCCH is indicated as low priority by having the [priority indicator] field in the scheduling DCI set to 0 or by not having the [priority indicator] field present in the scheduling DCI, the UE is expected to transmit the PUSCH corresponding to the configured grant, and cancel the PUSCH transmission scheduled by the PDCCH at latest starting at the first symbol of the PUSCH corresponding to the configured grant.

Otherwise, the UE shall cancel the PUSCH transmission corresponding to the configured grant at latest starting M symbols after the end of the last symbol of the PDCCH carrying the DCI scheduling the PUSCH, and transmit the PUSCH scheduled by the PDCCH, where $M = T_{proc,2} + d_1$, where $T_{proc,2}$ is given by clause 6.4 for the corresponding PUSCH timing capability assuming $d_{2,1} = 0$ and $d_1$ is determined by the reported UE capability [XXXXX], In this case, the UE is not expected to be scheduled for the PUSCH by the PDCCH where the PUSCH starts earlier than N symbols after the end of the last symbol of the PDCCH, where $N = T_{proc,2} + d_2$, where $T_{proc,2}$ is the PUSCH preparation time of the PUSCH scheduled by the PDCCH using the associated PUSCH timing capability according to clause 6.4 and $d_2$ is determined by the reported UE capability [YYYYY].

In case of PUSCH repetitions, the overlapping handling is performed for each PUSCH repetition separately.

The UE is not expected to be scheduled for another PUSCH by a PDCCH where this PUSCH starts no earlier than the end of the prioritized transmitted PUSCH and before the end of the time domain allocation of the cancelled PUSCH.]

Frequency Hopping Mechanism and Signalling

In NR up to Rel-16, Different frequency hopping (FH) types are supported for multi-slot PUSCH. More specifically, intra-slot and inter-slot FH are supported for PUSCH repetition Type A; inter-slot and inter-repetition FH are supported for repetition Type B. The two types of PUSCH repetition apply to PUSCH with dynamic grant and Type-1/2 configured grant. Indication of whether frequency hopping is enabled, type of frequency hopping, and frequency hopping offset lists are RRC configured. For PUSCH with dynamic grant and Type 2 configured grant, DCI field Frequency hopping flag further activates FH and frequency domain resource assignment (FDRA) indicates one offset list. For Type 1 configured grant PUSCH, frequency hopping activation and one frequency hopping offset is RRC configured.

The number of configurable frequency hopping offsets depends on BWP size, with four at maximum.

When the size of the active BWP is less than 50 PRBs, one of two higher layer configured offsets is indicated in the UL grant.

When the size of the active BWP is equal to or greater than 50 PRBs, one of four higher layer configured offsets is indicated in the UL grant.

For PUSCH repetition Type A:

In case of intra-slot frequency hopping, the starting RB in each hop is given by:

$$RB_{start} = \begin{cases} RB_{start} & i = 0 \\ (RB_{start} + RB_{offset}) \bmod N_{BWP}^{size} & i = 1 \end{cases}$$

where i=0 and i=1 are the first hop and the second hop respectively, and $RB_{start}$ is the starting RB within the UL BWP, as calculated from the resource block assignment information of resource allocation type 1 (described in Clause 6.1.2.2.2) or as calculated from the resource assignment for MsgA PUSCH (described in [6, TS 38.213]) and $RB_{offset}$ is the frequency offset in RBs between the two frequency hops. The number of symbols in the first hop is given by $$\lfloor N_{symb}^{PUSCHs}/2 \rfloor,$$

the number of symbols in the second hop is given by $$N_{symb}^{PUSCHs} - \lfloor N_{symb}^{PUSCHs}/2 \rfloor,$$

where $$N_{symb}^{PUSCH,s}$$

is the length of the PUSCH transmission in OFDM symbols in one slot.

In case of inter-slot frequency hopping, the starting RB during slot $$n_s^\mu$$

is given by:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases}$$

where $$n_s^\mu$$

is the current slot number within a radio frame, where a multi-slot PUSCH transmission can take place, $RB_{start}$ is the starting RB within the UL BWP, as calculated from the resource block assignment information of resource allocation type 1 (described in Clause 6.1.2.2.2) and $RB_{offset}$ is the frequency offset in RBs between the two frequency hops.

PUSCH repetition Type B supports inter-repetition FH and inter-slot FH. Inter-repetition FH is per nominal repetition.

In case of inter-repetition frequency hopping, the starting RB for an actual repetition within the n-th nominal repetition (as defined in Clause 6.1.2.1) is given by:

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases}$$

where $RB_{start}$ is the starting RB within the UL BWP, as calculated from the resource block assignment information of resource allocation type 1 (described in Clause 6.1.2.2.2) and $RB_{offset}$ is the frequency offset in RBs between the two frequency hops.

From 38.331 v16.1.0:

| PUSCH-Config information element |
| --- |

```
-- ASN1START
-- TAG-PUSCH-CONFIG-START
...
    frequencyHopping                          ENUMERATED {intraSlot, interSlot}
OPTIONAL,                -- Need S
    frequencyHoppingOffsetLists               SEQUENCE (SIZE (1..4)) OF INTEGER (1..
maxNrofPhysicalResourceBlocks-1)
OPTIONAL,                -- Need M
...
```

| PUSCH-Config information element |
|---|

```
    frequencyHoppingDCI-0-2-r16                CHOICE {
        pusch-RepTypeA                             ENUMERATED {intraSlot,
interSlot},
        pusch-RepTypeB                             ENUMERATED {interRepetition,
interSlot}
    }
OPTIONAL,                   -- Need S
    frequencyHoppingOffsetListsDCI-0-2-r16     SetupRelease { FrequencyHoppingOffsetListsDCI-0-2-
r16}                        OPTIONAL, -- Need M
    codebookSubsetDCI-0-2-r16                  ENUMERATED {fullyAndPartialAndNonCoherent,
partialAndNonCoherent,nonCoherent}
OPTIONAL,                   -- Cond codebookBased
...

frequencyHoppingDCI-0-1-r16                ENUMERATED {interRepetition, interSlot}
OPTIONAL,                   -- Cond RepTypeB
...
FrequencyHoppingOffsetListsDCI-0-2-r16 ::=    SEQUENCE (SIZE (1..4)) OF INTEGER (1..
maxNrofPhysicalResourceBlocks-1)

...
-- TAG-PUSCH-CONFIG-STOP
-- ASN1STOP
``` frequencyHopping
The value intraSlot enables 'Intra-slot frequency hopping' and the value interSlot enables 'Inter-slot frequency
hopping'. If the field is absent, frequency hopping is not configured for 'pusch-RepTypeA' (see TS 38.214 [19], clause
6.3). The field frequencyHopping applies to DCI format 0_0 and 0_1 for 'pusch-RepTypeA'.
frequencyHoppingDCI-0-1
Indicates the frequency hopping scheme for DCI format 0_1 when pusch-RepTypeIndicatorDCI-0-1 is set to 'pusch-
RepTypeB', The value interRepetition enables 'Inter-repetition frequency hopping', and the value interSlot enables
'Inter-slot frequency hopping'. If the field is absent, frequency hopping is not configured for DCI format 0_1 (see TS
38.214 [19], clause 6.1).
frequencyHoppingDCI-0-2
Indicate the frequency hopping scheme for DCI format 0_2. The value intraSlot enables 'intra-slot frequency hopping',
and the value interRepetition enables 'Inter-repetition frequency hopping', and the value interSlot enables 'Inter-slot
frequency hopping'. When pusch-RepTypeIndicatorDCI-0-2 is set to 'pusch-RepTypeA', the frequency hopping
scheme can be chosen between 'intra-slot frequency hopping and 'inter-slot frequency hopping' if enabled. When
pusch-RepTypeIndicatorDCI-0-2 is set to 'pusch-RepTypeB', the frequency hopping scheme can be chosen between
'inter-repetition frequency hopping' and 'inter-slot frequency hopping' if enabled. If the field is absent, frequency
hopping is not configured for DCI format 0_2 for 'pusch-RepTypeB' (see TS 38.214 [19], clause 6.3).
frequencyHoppingOffsetLists, frequencyHoppingOffsetListsDCI-0-2
Set of frequency hopping offsets used when frequency hopping is enabled for granted transmission (not msg3) and
type 2 configured grant activation (see TS 38.214 [19], clause 6.3). The field frequencyHoppingOffsetLists applies to
DCI format 0_0 and DCI format 0_1 and the field frequencyHoppingOffsetListsDCI-0-2 applies to DCI format 0_2 (see
TS 38.214 [19], clause 6.3).

45

| ConfiguredGrantConfig information element |
|---|

```
-- ASN1 START
-- TAG-CONFIGUREDGRANTCONFIG-START
ConfiguredGrantConfig ::=                   SEQUENCE {
    frequencyHopping                            ENUMERATED {intraSlot, interSlot}
OPTIONAL,            -- Need S
...
    rrc-ConfiguredUplinkGrant                   SEQUENCE {
        timeDomainOffset                            INTEGER (0..5119),
        timeDomainAllocation                        INTEGER (0..15),
        frequencyDomainAllocation                   BIT STRING (SIZE(18)),
        antennaPort                                 INTEGER (0..31),
        dmrs-SeqInitialization                      INTEGER (0..1)
OPTIONAL,            -- Need R
        precodingAndNumberOfLayers                  INTEGER (0..63),
        srs-ResourceIndicator                       INTEGER (0..15)
OPTIONAL,            -- Need R
        mcsAndTBS                                   INTEGER (0..31),
        frequencyHoppingOffset                      INTEGER (1.. maxNrofPhysicalResourceBlocks-1)
OPTIONAL,            -- Need R
        pathlossReferenceIndex                      INTEGER (0..maxNrofPUSCH-PathlossReferenceRSs-1),
```

-continued

| ConfiguredGrantConfig information element |
| --- |

```
    ...,
    [[
    pusch-RepTypeIndicator-r16                ENUMERATED {pusch-RepTypeA,pusch-RepTypeB}
OPTIONAL,        -- Need M
    frequencyHoppingPUSCH-RepTypeB-r16        ENUMERATED {interRepetition, interSlot}
OPTIONAL,           -- Cond RepTypeB
    timeReferenceSFN-r16                      ENUMERATED {sfn512}
OPTIONAL         -- Need S
    ]]
    }
OPTIONAL,         -- Need R
    ...
-- TAG-CONFIGUREDGRANTCONFIG-STOP
-- ASN1STOP
``` frequencyHopping
The value intraSlot enables 'Intra-slot frequency hopping' and the value interSlot enables 'Inter-slot frequency
hopping'. If the field is absent, frequency hopping is not configured. The field frequencyHopping applies to configured
grant for 'pusch-RepTypeA' (see TS 38.214 [19], clause 6.3.1).
frequencyHoppingOffset
Frequency hopping offset used when frequency hopping is enabled (see TS 38.214 [19], clause 6.1.2 and clause 6.3).
frequencyHoppingPUSCH-RepTypeB
Indicates the frequency hopping scheme for Type 1 CG when pusch-RepTypeIndicator is set to 'pusch-RepTypeB'
(see TS 38.214 [19], clause 6.1). The value interRepetition enables 'Inter-repetition frequency hopping', and the value
interSlot enables 'Inter-slot frequency hopping'. If the field is absent, the frequency hopping is not enabled for Type 1
CG.

| PUCCH-Config information element |
| --- |

```
-- ASN1START
-- TAG-PUCCH-CONFIG-START
...
PUCCH-FormatConfig ::=          SEQUENCE {
    interslotFrequencyHopping      ENUMERATED {enabled}
OPTIONAL,        -- Need R
    additionalDMRS                 ENUMERATED {true}
OPTIONAL,        -- Need R
    maxCodeRate                    PUCCH-MaxCodeRate
OPTIONAL,        -- Need R
    nrofSlots                      ENUMERATED {n2,n4,n8}
OPTIONAL,        -- Need S
    pi2BPSK                        ENUMERATED {enabled}
OPTIONAL,        -- Need R
    simultaneousHARQ-ACK-CSI       ENUMERATED {true}
OPTIONAL         -- Need R
}
...
PUCCH-Resource ::=             SEQUENCE {
```

-continued

| PUCCH-Config information element |
| --- |

```
    pucch-ResourceId               PUCCH-ResourceId,
    startingPRB                    PRB-Id,
    intraSlotFrequencyHopping      ENUMERATED { enabled }
OPTIONAL, -- Need R
    secondHopPRB                   PRB-Id
OPTIONAL, -- Need R
    format                         CHOICE {
        format0                        PUCCH-format0,
        format1                        PUCCH-format1,
        format2                        PUCCH-format2,
        format3                        PUCCH-format3,
        format4                        PUCCH-format4
    }
}
...
-- TAG-PUCCH-CONFIG-STOP
-- ASN1STOP
``` interslotFrequencyHopping
If the field is present, the UE enables inter-slot frequency hopping when PUCCH Format 1, 3 or 4 is repeated over
multiple slots. For long PUCCH over multiple slots, the intra and inter slot frequency hopping cannot be enabled at
the
same time for a UE. The field is not applicable for format 2. See TS 38.213 [13], clause 9.2.6.

intraSlotFrequencyHopping
Enabling intra-slot frequency hopping, applicable for all types of PUCCH formats. For long PUCCH over multiple slots,
the intra and inter slot frequency hopping cannot be enabled at the same time for a UE. See TS 38.213 [13], clause
9.2.1.

In 38.212 v16.3.0:

In Format 0_0:

Frequency domain resource assignment—

$$\lceil \log_2(N_{RB}^{UL,BWP}(N_{RB}^{UL,BWP}+1)/2)\rceil$$

bits if neither of the higher layer parameters useInterlacePUCCH-PUSCH in BWP-UplinkCommon and usefnterlacePUCCH-PUSCH in BWP-UplinkDedicated is configured, where $$N_{RB}^{UL,BWP}$$

is defined in cause 7.3.1.0

For PUSCH hopping with resource allocation type 1:

$N_{UL\_hop}$ MSB bits are used to indicate the frequency offset according to Clause 6.3 of [6, TS 38.214], where $N_{UL\_hop}$=1 if the higher layer parameterfrequencyHoppingOffsetLists contains two offset values and $N_{UL\_hop}$=2 if the higher layer parameterfrequencyHoppingOffsetLists contains four offset values $$\lceil \log_2(N_{RB}^{UL,BWP}(N_{RB}^{UL,BWP}+1)/2)\rceil - N_{UL\_hop}$$

bits provides the frequency domain resource allocation according to Clause 6.1.2.2.2 of [6, TS 38.214]

. . .

Frequency hopping flag—1 bit according to Table 7.3.1.1.1-3, as defined in Clause 6.3 of [6, TS 38.214]

In Format 0_1 and format 0_2:

Frequency domain resource assignment—number of bits determined by the following, where $$N_{RB}^{UL,BWP}$$

is the size of the active UL bandwidth part:

If higher layer parameter useInterlacePUCCH-PUSCH in BWP-UplinkDedicated is not configured

. . .

For resource allocation type 1, the $$\lceil \log_2(N_{RB}^{UL,BWP}(N_{RB}^{UL,BWP}+1)/2)\rceil$$

LSBs provide the resource allocation as follows:

For PUSCH hopping with resource allocation type 1:

$N_{UL\_hop}$ MSB bits are used to indicate the frequency offset according to Clause 6.3 of [6, TS 38.214], where $N_{UL\_hop}$=1 if the higher layer parameterfrequencyHoppingOffsetLists contains two offset values and $N_{UL\_hop}$=2 if the higher layer parameterfrequencyHoppingOffsetLists contains four offset values $$\lceil \log_2(N_{RB}^{UL,BWP}(N_{RB}^{UL,BWP}+1)/2)\rceil - N_{UL\_hop}$$

bits provides the frequency domain resource allocation according to Clause 6.1.2.2.2 of [6, TS 38.214]

For non-PUSCH hopping with resource allocation type 1:

$$\lceil \log_2(N_{RB}^{UL,BWP}(N_{RB}^{UL,BWP}+1)/2)\rceil$$

bits provides the frequency domain resource allocation according to Clause 6.1.2.2.2 of [6, TS 38.214]

. . .

Frequency hopping flag—0 or 1 bit:

0 bit if only resource allocation type 0 is configured, or if the higher layer parameterfrequencyHopping is not configured and the higher layer parameter pusch-RepTypefndicatorForDCI-Format0-1 is not configured to pusch-RepTypeB, or if the higher layer parameter frequencyHoppingForDCI-Format0-1 is not configured and pusch-RepTypeIndicatorForDCI-Format0-1 is configured to pusch-RepTypeB, or if only resource allocation type 2 is configured;

1 bit according to Table 7.3.1.1.1-3 otherwise, only applicable to resource allocation type 1, as defined in Clause 6.3 of [6, TS 38.214].

. . .

TABLE 7.3.1.1.1-3

| Frequency hopping indication | |
| --- | --- |
| Bit field mapped to index | PUSCH frequency hopping |
| 0 | Disabled |
| 1 | Enabled |

UE-Determined Number of Repetitions in Rel-15 NB-IoT

The number of repetitions changes depending on the actual transport block size (TBS), potentially including numbers of repetitions which are not included in legacy NPUSCH repetition numbers.

The Early Data Transmission (EDT) UL Grant Shall Allow the UE to Choose an appropriate TB size, MCS, repetitions, and RUs (for NB-IoT) from a set of TB sizes provided based on the UL data.

Early Termination of PUSCH Repetitions in Rel-15 NB-IoT and LTE-MTC

Positive HARQ-ACK feedback to the UE during an ongoing PUSCH transmission to enable early termination, has been introduced in Rel-15. This is made possible by using a DCI state (per CE mode) to indicate termination of any ongoing PUSCH transmission. MPDCCH monitoring continues until there are no more retransmissions. Unless the indication is sent to acknowledge an RRC Connection release, in which case the MPDCCH monitoring is terminated as well. In other words, if there is no ongoing PUSCH transmission and one or more drx-ULRetransmission timers are running, the reception of UL HARQ-ACK feedback on MPDCCH indicates ACKs for all HARQ processes. If there is an ongoing PUSCH transmission for a HARQ process and the drx-ULRetransmissionTimer for other HARQ process is running, only the ongoing PUSCH transmission is stopped when the UL HARQ-ACK is received on MPDDCH.

In more detail, for the UE-specific UL explicit HARQ-ACK feedback in CE Mode A, ACK is indicated by DCI format 6-0A where 'Resource block assignment' field is set to be all '1's. While for the UE-specific UL explicit HARQ-ACK feedback in CE Mode B, ACK is indicated by DCI format 6-0B where 'MCS' field is set to be '1111'.

RAN1 #90:

Explicit HARQ-ACK feedback is supported for the following purpose(s):

Early termination of MPDCCH monitoring before going to sleep (details up to RAN2)

RAN1 #92bis:

One unused DCI state in each CE mode is used for indicating:

Early termination of any ongoing PUSCH transmission (without early termination of MPDCCH monitoring except for the case of acknowledging RRC Connection Release, for which MPDCCH monitoring is terminated)

For the UE-specific UL HARQ-ACK feedback, ACK is indicated by DCI format 6-0A and 6-0B for CE mode A and CE mode B, respectively, by setting all fields except the ones below to default fixed value 'Flag for format 6-0A/6-1A differentiation' in CE mode A and 'Flag for format 6-0B/6-1B differentiation' in CE mode B 'DCI subframe repetition number' field

RAN1 #93:

For the UE-specific UL explicit HARQ-ACK feedback in CE Mode A, ACK is indicated by DCI format 6-0A where 'Resource block assignment' field is set to be all '1's.

For the UE-specific UL explicit HARQ-ACK feedback in CE Mode B, ACK is indicated by DCI format 6-0B where 'MCS' field is set to be '1111'.

RAN2 #101:

Early termination of MPDCCH and/or PUSCH can be used to complete RRC connection release procedure faster. RAN2 assumes no changes in RAN2 specification to capture this agreement.

RAN2 #102:

If there is no ongoing PUSCH transmission and one or more drx-ULRetransmission timers are running, the reception of UL HARQ-ACK feedback on PDCCH indicates ACK for all HARQ processes.

If PUSCH transmission is ongoing for a HARQ process and drx-ULRetransmissionTimer for other HARQ process is running, only ongoing PUSCH transmission is stopped when UL HARQ-ACK is received on PDDCH that indicates ACK.

UE capability signalling and NW enabling configuration of HARQ-ACK feedback are introduced.

CG-DFI in Rel-16 NR-U

NR in licensed spectrum does not support non-adaptive HARQ operation. ACK feedback is implicit and NACK is explicit. A timer (i.e., configuredGrantTimer) starts when a TB is transmitted, and if no explicit NACK (dynamic grant) is received before the timer expires the UE assumes ACK. This approach does not work well on the unlicensed carrier since the absence of feedback might be due to failed LBT. The UE may misinterpret a delayed retransmission grant as an ACK. Since the channel availability is not guaranteed on the unlicensed channel, the UE might run into this situation often. For this reason, CG NR-U follows the opposite behaviour, where ACK feedback is explicit and NACK is implicit. A second timer (i.e., cg-RetransmissionTimer (CGRT)) starts when a TB is transmitted, and if no explicit ACK is received before the timer expires the UE assumes NACK and perform non-adaptive retransmission. To reduce the signalling overhead corresponding to explicit feedback transmission, NR-U supports a new DCI format, downlink feedback information ("CG-DFI"), that carry HARQ-ACK bitmap for all UL HARQ processes from the same UE. Additionally, the gNB may trigger an adaptive retransmission using a dynamic grant.

In a summary, non-adaptive retransmission is supported in NR-U if no explicit ACK is received before cg-RetransmissionTimer expires; adaptive retransmission with a dynamic grant is also supported with NACK feedback via DFI for the corresponding HARQ process.

UE may autonomously initiate retransmission for a HARQ process that was initially transmitted via configured grant mechanism for NR-unlicensed when one of the following conditions is met:

Reception of NACK feedback via DFI

No reception of feedback from gNB upon the timer expiration

From 38.212 v16.3.0:

TABLE 7.3.1-1

| DCI formats | |
| --- | --- |
| DCI format | Usage |
| 0_1 | Scheduling of one or multiple PUSCH in one cell, or indicating downlink feedback information for configured grant PUSCH (CG-DFI) |

DCI format 0_1 is used for the scheduling of one or multiple PUSCH in one cell, or indicating CG downlink feedback information (CG-DFI) to a UE.

The following information is transmitted by means of the DCI format 0_1 with CRC scrambled by C-RNTI or CS-RNTI or SP-CSI-RNTI or MCS-C-RNTI:

Identifier for DCI formats—1 bit

The value of this bit field is always set to 0, indicating an UL DCI format

Carrier indicator—0 or 3 bits, as defined in Clause 10.1 of [5, TS38.213].

DFI flag—0 or 1 bit 1 bit if the UE is configured to monitor DCI format 0_1 with CRC scrambled by CS-RNTI and for operation in a cell with shared spectrum channel access. For a DCI format 0_1 with CRC scrambled by CS-RNTI, the bit value of 0 indicates activating type 2 CG transmission and the bit value of 1 indicates CG-DFI. For a DCI format 0_1 with CRC scrambled by C-RNTI/SP-CSI-RNTI/MCS-C-RNTI and for operation in a cell with shared spectrum channel access, the bit is reserved.

0 bit otherwise;

If DCI format 0_1 is used for indicating CG-DFI, all the remaining fields are set as follows:

HARQ-ACK bitmap—16 bits, where the order of the bitmap to HARQ process index mapping is such that HARQ process indices are mapped in ascending order from MSB to LSB of the bitmap. For each bit of the bitmap, value 1 indicates ACK, and value 0 indicates NACK.

TPC command for scheduled PUSCH—2 bits as defined in Clause 7.1.1 of [5, TS38.213]

All the remaining bits in format 0_1 are set to zero.

Intra-UE Prioritization

Rel-16 supports a two-level PHY priority index indication of:

Scheduling Request (SR): SR configuration may have a PHY priority index indication as an RRC field in SR resource configuration.

Note: PHY priority index is only used to let PHY know the priority. MAC will perform prioritization based on LCH priorities.

HARQ-ACK: PHY priority index may be indicated in DL DCI (Format 1_1 and 1_2) for dynamic assignments while for SPS the PHY priority index may be indicated by RRC configuration.

PUSCH: For DG (Dynamic Grant) PHY priority index, may be indicated in UL DCI (Format 0_1 and 0_2) and for CG the PHY priority index may be indicated by CG configuration.

A-periodic and semi-persistent CSI on PUSCH: PHY priority index may be indicated in UL DCI (Format 0_1 and 0_2).

In Rel-16, UCI (Uplink Control Information) is multiplexed in a PUCCH or a PUSCH if PHY priority index of UCI and the PHY priority index of PUCCH or PUSCH is the same.

The intra-UE PHY prioritization first resolves time-overlapping for PUCCH and/or PUSCH transmissions for same priority, then time-overlapping between priorities is resolved, where the lower-priority PUCCH/PUSCH is not transmitted if it is time-overlapping with a higher-priority PUCCH/PUSCH transmission.

As mentioned above, PUSCH when UE is RRC connected has been identified as one of the bottlenecks of cell coverage. In NR Rel-15 and 16, PUSCH repetition has been studied and improved, but it still has some restrictions, for example, the maximum and allowed number of repetitions without UE assistance, DMRS configuration and frequency hopping pattern across repetitions.

TX diversity of PUSCH transmissions is transparent to the standard in NR Rel-15 and Rel-16, when repetitions are used for PUSCH transmissions, coherent IQ combining may outperform soft-combining for all repetitions especially when the number of repetitions are larger and the signal level of each single repetition is already quite low, which may require that no TX diversity is applied in NR, meaning that the receiver should be aware of whether a TX diversity is actually applied or not on the transmitter side. Frequency hopping may be another factor for improving the receiver performance when receiving signals repeatedly transmitted.

NR Rel-15 introduced PUSCH slot aggregation. If semi-static DL/UL assignment configuration of a slot conflicts between uplink and downlink direction with scheduled DCI granted multi-slot PUSCH transmission, the PUSCH transmission in that slot is not received/transmitted, i.e. the effective number of repetitions reduces. What's more, NR R16 introduced 2-level PHY priority index. The lower-priority PUCCH/PUSCH is not transmitted if it is time-overlapping with a higher-priority PUCCH/PUSCH transmission. PUSCH repetition methods in both NR Rel-15 and R16 are only time domain based.

Some embodiments of the present disclosure provide methods on how to improve coverage of PUSCH transmissions from UEs. The methods cover solutions to improve the PUSCH performance with respect to TX diversity, repetition, and frequency hopping of PUSCH, among the others.

FIG. 1 is an overview diagram illustrating an exemplary 5G New Radio (NR) network system 10 in which enhancement for uplink data transmission according to an embodiment of the present disclosure is applicable. As shown in FIG. 1, the system 10 may comprise a network node (e.g. a gNB) 120 and one or more terminal devices (e.g. UE #1

110-1 and UE #2 110-2, which will be referred to as UE 110 collectively) 110. The network node 120 may provide the UEs 110 with access to a core network 130 and further to the Internet 140 via its radio links. The radio links may comprise one or more UL channels and one or more DL channels, e.g. those mentioned above, such as PDCCH, PDSCH, PUCCH, PUSCH, etc. However, the present disclosure is not limited thereto. In some other embodiments, the system 10 may comprise more than one network node 120 and one or more than two terminal devices 110. Further, in some other embodiments, the radio links between the UE 110 and the gNB 120 may be other channels than those used in 5G NR.

FIG. 2 is a diagram illustrating exemplary protocol stacks with which enhancement for uplink data transmission according to an embodiment of the present disclosure is applicable. For the user plane protocol stack shown in the upper portion of FIG. 2, the protocol stack may comprise:

Layer 1: physical (PHY) layers 211 at UE 210 and 221 at gNB 220;

Layer 2: medium access control (MAC) layers 212 and 222, radio link control (RLC) layers 213 and 223, packet data convergence protocol (PDCP) layers 214 and 224, and service data adaptation protocol (SDAP) layers 215 and 225.

The PHY Layer 211 and 221 may provide at least one of following functions:

Error detection on the transport channel and indication to higher layers

FEC encoding/decoding of the transport channel

Hybrid ARQ soft-combining

Rate matching of the coded transport channel to physical channels

Mapping of the coded transport channel onto physical channels

Power weighting of physical channels

Modulation and demodulation of physical channels

Frequency and time synchronization

Radio characteristics measurements and indication to higher layers

Multiple Input Multiple Output (MIMO) antenna processing

Transmit Diversity (TX diversity)

Digital and Analog Beamforming

RF processing

The channels mentioned above, such as, PUSCH, PUCCH, PDSCH, PDCCU, etc. are all PHY layer or Layer 1 channels.

Following are the functions of the MAC layer 212 and 222 or sub-layer within Layer 2:

Beam management

Random access procedure

Mapping between logical channels and transport channels

Concatenation of multiple MAC SDUs belonging to one logical channel into transport block (TB)

Multiplexing/demultiplexing of 5G-MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling Transport format selection Padding Following are the functions of the RLC layer 213 and 223 or sub-layer within Layer 2:

Transfer of upper layer PDUs

Error Correction through ARQ (only for AM data transfer)

Reordering of 5G-RLC data PDUs (only for UM and AM data transfer)

Duplicate detection (only for UM and AM data transfer)

Protocol error detection (only for AM data transfer)

5G-RLC SDU discard (only for UM and AM data transfer)

Segmentation (only for UM and AM data transfer)

Resegmentation (only for AM data transfer)

5G-RLC re-establishment

Following are the functions of PDCP layer 212 and 222 or sublayer within Layer 2:

Transfer of user data

In-sequence delivery of upper layer PDUs at 5G-PDCP re-establishment procedure for 5G-RLC AM Duplicate detection of lower layer SDUs at 5G-PDCP re-establishment procedure for 5G-RLC AM Retransmission of 5G-PDCP SDUs at mobility in connected mode for 5G-RLC AM Ciphering and deciphering (Note: Only AES shall be mandatory)

Timer-based SDU discard in uplink

Ciphering and Integrity Protection (Note: Only AES shall be mandatory)

Transfer of control plane data

The SDAP layer 215 and 225 are new layers introduced by 5G NR for new quality of service handling, and is a user plane protocol layer only. The main services and functions of SDAP layer 215 and 225 are:

Mapping between a QoS flow bearers to data radio bearer according to their quality of service Making QoS flow ID (QFI) in both DL and UL packets.

Further, as shown in the lower portion of FIG. 2, the control plane protocol stack may comprise Radio Resource Control (RRC) layers 216 and 226 instead of the SDAP layers 215 and 225 comprised in the user plane protocol stack. Typically, the RRC layer 216 and 226 are referred to as Layer 3.

Following are the functions of 5G layer 3 i.e. RRC Layer 216 and 226:

Broadcasting of system information to NAS and AS.

Establishment, maintenance and release of RRC connection.

Security including key management

Establishment, configuration, maintenance and release of point-point radio bearers.

Mobility functions along with cell addition and cell release

UE measurement reporting, control of UE reporting, UE based mobility

NAS direct message transfer to/from NAS from/to UE

Refer 5G NR UE RRC states >> and their functions and RRC IEs>>(Information Elements) used in 5G NR UE/gNB and 5G NR system for various purposes. Some embodiments of the present disclosure will be described below with reference to Layer 1 (PHY 211 and 221) and Layer 3 (RRC 216 and 226).

FIG. 3 is a message flow diagram illustrating exemplary procedures for uplink data transmission during which enhancement for uplink data transmission according to an embodiment of the present disclosure is applicable.

As shown in (a) of FIG. 3, a procedure for uplink data transmission based on dynamic UL grant will be described. Whenever there is data to be transmitted from the UE 210 to the gNB 220, the UE 210 may ask gNB about uplink grant using "scheduling request" message over the PUCCH channel (when UE 210 is in the connected state) or PRACH channel (e.g. when the UE is attempting initial access), as shown in step 305. The gNB 220 may reply the UE with an uplink grant, for example, in a DCI 0_0, DCI 0_1 or DCI 0_2 message over the PDCCH channel at step 310. Upon reception of the uplink grant which may assign the UE with uplink resources for uplink data transmission, the UE 210 may start transmitting the data over the assigned resources over the PUSCH channel.

Further, 5G networks are expected to support applications demanding ultra-reliable and low latency communication services (URLLC). To support these kind of applications 5G-NR introduced grant free uplink transmission feature a.k.a. Transmission without grant (TWG), i.e. data transmission without resource request. Transmission without grant can avoid the regular handshake delay e.g. sending the scheduling request (e.g. step 305) and waiting for UL grant allocation (e.g. step 310). Another advantage is that it can relax the stringent reliability requirements on control channels.

As shown in (b) of FIG. 3, the PUSCH channel can also be semi-statically (or semi-persistently) configured by UL grant via RRC (Layer 3) signaling, which is also referred to as grant free configuration scheme. There are two types of grant free configuration schemes supported in 5G NR:

TWG Type 1: Uplink grant configuration, activation/deactivation provided by RRC signaling, shown as steps 355, 370, 375, and 380;

TWG Type 2: Uplink grant configuration provided via RRC signaling and its activation/deactivation via PDCCH grant (via UL DCIs), shown as steps 355, 360, 365, 370, 375, and 380.

TWG Type 1 is very much similar to LTE semi-persistent scheduling (SPS) where UL data transmission is based on RRC reconfiguration without any L1 signaling. The gNB 220 provides the grant configuration to UE 210 through a higher layer parameter, such as ConfiguredGrantConfig comprising the parameter rrc-ConfiguredUplinkGrant without the detection of any UL grant in a DCI. Potentially SPS scheduling can provide the suitability for deterministic URLLC traffic pattern, because the traffic properties can be well matched by appropriate resource configuration.

To be specific, at step 355, the gNB 220 may provide an RRC configuration to the UE 210 for activating a semi-persistent UL resource for the UE 210's UL data transmission. At step 370, whenever there is data to be transmitted by the UE 210 to the gNB 220, the UE 210 may use the configured UL resource to deliver the data. At Step 375, the gNB 220 may provide feedbacks on the data received from the UE 210 with ACK/NACK. After the transmission of the data, the gNB 220 may deactivate the semi-persistently assigned resource by sending RRC configuration release or deactivation at step 380.

TWG Type 2 involves an additional L1 signaling (DCI), where uplink is semi-persistently scheduled by an UL grant in a valid activation DCI. The grant is activated and deactivated through DCI scrambled with CS-RNTI. RRC only provides a higher layer parameter ConfiguredGrantConfig not including rrc-ConfiguredUplinkGrant. The DCI signaling can enable fast modification of semi-persistently allocated resources. In this way, it enables the flexibility of UL Grant Free transmission in term of URLLC traffic properties for example packet arrival rate, number of UEs sharing the same resource pool and/or packet size.

Note: Both type 1 and type 2 are configured by RRC per Serving Cell and per BWP. For the same Serving Cell, the NR MAC entity is configured with either Type 1 or Type 2.

There is no specific Activation/Release procedure is provided for TWG type1. RRC signaling with parameter ConfiguredGrantConfig including the parameter rrc-ConfiguredUplinkGrant implicitly means that TWG type 1 is activation. Also, for release no dedicated Information Element (IE) is sent by gNB 220, in order to release the TWG scheduling configuration, the gNB 220 just sends RRC reconfiguration release to UE.

TWG Type 2 scheduling activation or scheduling release happens via PDCCH decoded DCIs if the CRC of a corresponding DCI format is scrambled with CS-RNTI and the new data indicator field for the enabled transport block is set to "0". Validation of the DCI format is achieved if all fields for the DCI format are set according to special fields for UL grant type 2 scheduling activation or scheduling release. If validation is achieved, UE 210 may consider the information in the DCI format as valid activation or valid release of configured UL grant type 2.

Next, some specific embodiments for enhancing uplink data transmission will be described in details. They are generally related to time domain based solutions, frequency domain based solutions, spatial domain based solutions, and any combination thereof. Please note: although these embodiments are described separately, they can be combined in any appropriate manner to achieve a similar or even better technical effect.

Time-Domain Based Solutions

In some embodiments, the number of PUSCH repetitions may be increased to achieve a better cell coverage. To be specific, a straightforward solution to improve PUSCH coverage is time-domain repetition. The supported number of repetitions in NR Rel-15 are 2, 4 and 8 and configured by RRC, as mentioned above. In NR Rel-16, UE can be configured with higher layer parameter of PUSCH time domain resource allocation list, which has multiple entries of PUSCH time domain resource allocation. Each allocation indicates one number of repetitions from candidate values of 1, 2, 3, 4, 7, 8, 12, and 16, and UL DCI indicates one of the entries dynamically.

Therefore, in some embodiments, the maximum number of repetitions can be increased to a larger number, such as 32 or 64 (but not limited thereto); intermediate numbers of repetitions can also be supported. The candidate numbers of repetitions can be increased from 8 values to no more than 16 values, but not limited thereto. For example, the candidate values of the repetition numbers could be: 1, 2, 3, 4, 7, 8, 12, 16, 18, 20, 22, 24, 26, 28, 30, and 32.

Further, in some embodiments, the number of repetitions can be configured and dynamically activated with one or more of below methods.

Option 1: Rel. 16 IE numberOfRepetitions may be extended for each TDRA entry with new values;

Option 2: a new IE similar to numberOfRepetitions which may contain new candidate numbers of repetitions is introduced.

Further, in some embodiments, the maximum number of PUSCH time domain resource allocations, maxNrofUL-Allocations, can be increased or remains the same as 64 in Rel-16.

For example, as shown below, pusch-TimeDomainAllocationListForDCI-Format0-1 and pusch-TimeDomainAllocationListForDCI-Format0-2 are the TDRA allocation list.

| PUSCH-Config information element |
|---|
| pusch-TimeDomainAllocationList    SetupRelease { PUSCH-TimeDomainResourceAllocationList } <br> pusch-AggregationFactor    ENUMERATED { n2, n4, n8 } <br> OPTIONAL, -- Need S <br> pusch-TimeDomainAllocationListForDCI-Format0-1-r17 SetupRelease { PUSCH-TimeDomainResourceAllocationList-r17 } <br> pusch-TimeDomainAllocationListForDCI-Format0-2-r17 SetupRelease { PUSCH-TimeDomainResourceAllocationList-r17 } |

According to Option 1, in each entry of PUSCH-TimeDomainResourceAllocationList-r17, numberOfRepetitions-r17 configures possible numbers of repetitions. In below, n18, n20, n22, 24, n26, n28, n30, n32 were added in addition to R16 values.

| PUSCH-TimeDomainResourceAllocation information element |
|---|
| -- ASN1START <br> -- TAG-PUSCH-TIMEDOMAINRESOURCEALLOCATIONLIST-START <br> PUSCH-TimeDomainResourceAllocationList ::=   SEQUENCE (SIZE(1..maxNrofUL-Allocations)) OF PUSCH-TimeDomainResourceAllocation <br> PUSCH-TimeDomainResourceAllocation ::= SEQUENCE { <br>    k2        INTEGER(0..32) <br> OPTIONAL, -- Need S <br>    mappingType        ENUMERATED {typeA, typeB}, <br>    startSymbolAndLength        INTEGER (0..127) <br> } <br> PUSCH-TimeDomainResourceAllocationList-r17 ::= SEQUENCE (SIZE(1..maxNrofUL-Allocations-r17)) OF PUSCH-TimeDomainResourceAllocation-r17 <br> PUSCH-TimeDomainResourceAllocation-r17 ::=   SEQUENCE { <br>    k2-r17        INTEGER(0..32)     OPTIONAL, -- Need S <br>    puschAllocationList-r17        SEQUENCE (SIZE(1..maxNrofMultiplePUSCHs-r17)) OF <br> PUSCH-Allocation-r17, <br>    ... <br> } |

-continued

| PUSCH-TimeDomainResourceAllocation information element | |
|---|---|
| PUSCH-Allocation-r17 ::= SEQUENCE { | |
| mappingType-r17 | ENUMERATED {typeA, typeB} |
| OPTIONAL, -- Cond NotFormat01-02-Or-TypeA | |
| startSymbolAndLength-r17 | INTEGER (0..127) |
| OPTIONAL, -- Cond NotFormat01-02-Or-TypeA | |
| startSymbol-r17 | INTEGER (0..13) |
| OPTIONAL, -- Cond RepTypeB | |
| length-r17 | INTEGER (1..14) |
| OPTIONAL, -- Cond RepTypeB | |
| numberOfRepetitions-r17 | ENUMERATED {n1, n2, n3, n4, n7, n8, n12, n16, n18, |
| n20, n22, n24, n26, n28, n30, n32} OPTIONAL, | -- Cond Format01-02 |
| ... | |
| } | |
| -- TAG-PUSCH-TIMEDOMAINRESOURCEALLOCATIONLIST-STOP | |
| -- ASN1STOP | |

According to Option 2, for each entry of the list, increasedNumberOfRepetitions-r17 may be a newly added IE, which can configure newly added number of repetitions.

| PUSCH-Allocation-r17 ::= SEQUENCE { | |
|---|---|
| mappingType-r17 | ENUMERATED {typeA, typeB} |
| OPTIONAL, -- Cond NotFormat01-02-Or-TypeA | |
| startSymbolAndLength-r17 | INTEGER (0..127) |
| OPTIONAL, -- Cond NotFormat01-02-Or-TypeA | |
| startSymbol-r17 | INTEGER (0..13) |
| OPTIONAL, -- Cond RepTypeB | |
| length-r17 | INTEGER (1..14) |
| OPTIONAL, -- Cond RepTypeB | |
| numberOfRepetitions-r17 | ENUMERATED {n1, n2, n3, n4, n7, n8, n12, n16} |
| OPTIONAL, -- Cond Format01-02 | |
| increasednumberOfRepetitions-r17 | ENUMERATED {n18, n20, n22, n24, n26, n28, n30, n32} |
| OPTIONAL, -- Cond Format01-02 | |
| ... | |
| } | |

In some embodiments, PUSCH repetitions may be early terminated for reducing latency. In NR up to Rel-16, PUSCH repetition can be used for PUSCH scheduled with dynamic grant or configured grant. For both cases, if not conflicting with TDD UL/DL configuration or transmissions outside configured grant's periodicity, all K repetitions are to be transmitted. Retransmission can be triggered for PUSCH with dynamic grant or configured grant, and there is no acknowledgement of that TB from gNB 220 either after or during the transmission of all repetitions. If the gNB 220 starts decoding after receiving some of all repetitions and successfully decodes the TB, a way to improve spectrum efficiency is for gNB 220 to early terminate ongoing repetitions. This can be done by an acknowledgement or indication of successful receiving of that TB.

Figure 4:
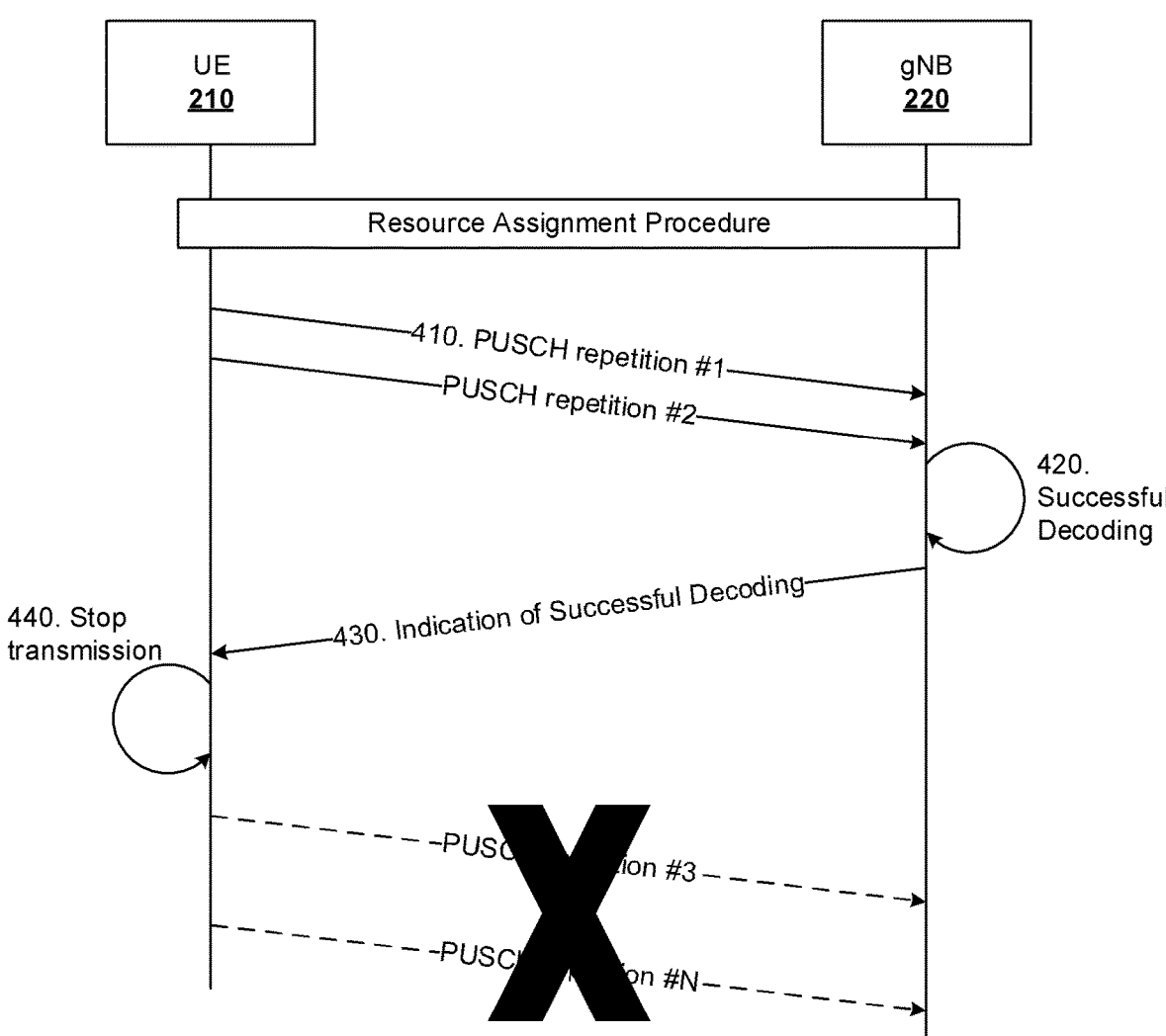
FIG. 4 is a message flow diagram illustrating an exemplary procedure for early termination of uplink data transmission according to an embodiment of the present disclosure.

FIG. 4 is a message flow diagram illustrating an exemplary procedure for early termination of uplink data transmission according to an embodiment of the present disclosure. As shown in FIG. 4, the UE 210 may communicate with gNB 220 for resource assignment, for example, as shown in FIG. 3.

Once the UE 210 is granted for UL transmission, at step 410, the UE 210 may begin transmitting the repetitions for the PUSCH transmission. At step 420, before all the repetitions are received, the gNB 220 may try to decode the received repetitions and may successfully decode the PUSCH from the received repetitions, and therefore at step 430, the gNB 220 may indicates the successful decoding to the UE 210 in an early stage before all the repetitions are transmitted by the UE 210. Upon reception of the indication, the UE 210 may stop the transmission of the remaining repetitions at step 440.

In some embodiments, for PUSCH repetition with a dynamic grant (e.g., as shown in (a) of FIG. 3), an indication of successfully receiving the TB from some PUSCH repetitions can be indicated in one or more of below ways.

a new DCI field or an existing unused DCI state in existing DCI formats, or a new DCI format including such DCI field is used for acknowledgment of one or more of the TBs in one or more of the HARQ processes. For example, a new field in DCI 0_0, 0_1, or 0_2 with CRC scrambled with UE's C-RNTI can be defined as 3-bit bitmap XYZ, where X, Y and Z are used to indicate successful reception of TBs for 3 groups of HARQ processes, where the HARQ process grouping can be specified in the specification or RRC configured or include the indices of HARQ processes used for PUSCH repetitions mapped in ascending order. If a bit is set to be 1, the TBs transmitted with HARQ process IDs in the corresponding HARQ process group are indicated as being successfully decoded by gNB. This method does not require additional new DCI format or new PDCCH monitoring, and thus saves UE energy.

UE 210 can be configured with a different RNTI for acknowledgment of a TB. If gNB 220 has successfully decoded the TB from the received PUSCH repetitions, it may send a DCI with CRC scrambled with the new RNTI and then UE 210 may stop transmitting accordingly. This method does not increase the DCI signaling overhead, but requires additional PDCCH monitoring.

UE can be configured with a different HARQ process number for acknowledgement. This acknowledgement HARQ process number is associated with the HARQ process number for the previous transmission of the TB. Namely, in current DCI 0_0, 0_1, or 0_2, field of HARQ process number is fixed with 4 bits with at most 16 HARQ processes. The gNB 220 can use some of the HARQ processes for UL grant and others for acknowledgement of corresponding processes. For example, UE is configured by RRC that HARQ processes with the number from 0000 to 0111 will be used for UL grant. Then DCI for the UE with HARQ process number 1XYZ is regarded as acknowledgement of HARQ process 0XYZ.

A DCI with NDI toggled can be used to terminate the remaining repetitions for the corresponding HARQ process while triggering a new TB transmission. The remaining repetitions can be e.g. be defined as the repetitions after the reception of this DCI with a minimum gap requirement after the last symbol of the PDCCH considering the PDCCH processing time.

In some embodiments, for PUSCH repetition with Type 1 or Type 2 configured grant (e.g., as shown in (b) of FIG. 3), an indication of successfully receiving TB from some PUSCH repetitions can be indicated in one or more of below ways.

In PDCCH with CRC scrambled with CS-RNTI, at least one HARQ process ID is indicated. For UE with Type-1 configured grant, the unused DCI state, e.g. NDI in the received HARQ information as 0, can indicate the successful decoding of the TB of indicated HARQ process ID. For UE with Type-2 configured grant, acknowledgement of a TB can be indicated by PDCCH contents, regardless of NDI value.

In PDCCH with CRC scrambled with CS-RNTI, the current I-bit NDI field is extended to 2 bits. Value of 10 and/or 11 can indicate acknowledgement of a TB.

A new DCI field is created for acknowledgment of receiving TB. For example, when UE 210 receives DCI 0_0, 0_1, or 0_2 with CRC scrambled with its C-RNTI or CS-RNTI, the field can indicate TB of indicated HARQ process ID(s) has been successfully decoded.

UE can be configured with a different HARQ process number for acknowledgement. This ACK HARQ process number is associated with the HARQ process number for the previous transmission of the TB.

A new DCI format is used for acknowledgement of HARQ process(es) of PUSCH repetition.

In some embodiments, in the acknowledgment, the number of repetitions the gNB 220 has received and/or the number of repetitions that UE can omit can be indicated.

In some embodiments, if the DCI for acknowledgment of a TB is received in slot n and the number of repetitions that UE can omit is not configured, when the UE 210 will stop the transmission of repetitions can be determined and indicated by one or more of below methods.

Option 1: UE 210 may stop the PUSCH transmission at least starting from (PDCCH decoding delay $d_{delay}$+$d_{offset}$) symbols after the end of the last symbol of the PDCCH. UE's PDCCH decoding delay $d_{delay}$ is reported to gNB 220 or fixed in specification. $d_{offset}$ is an offset value.

Figure 6:
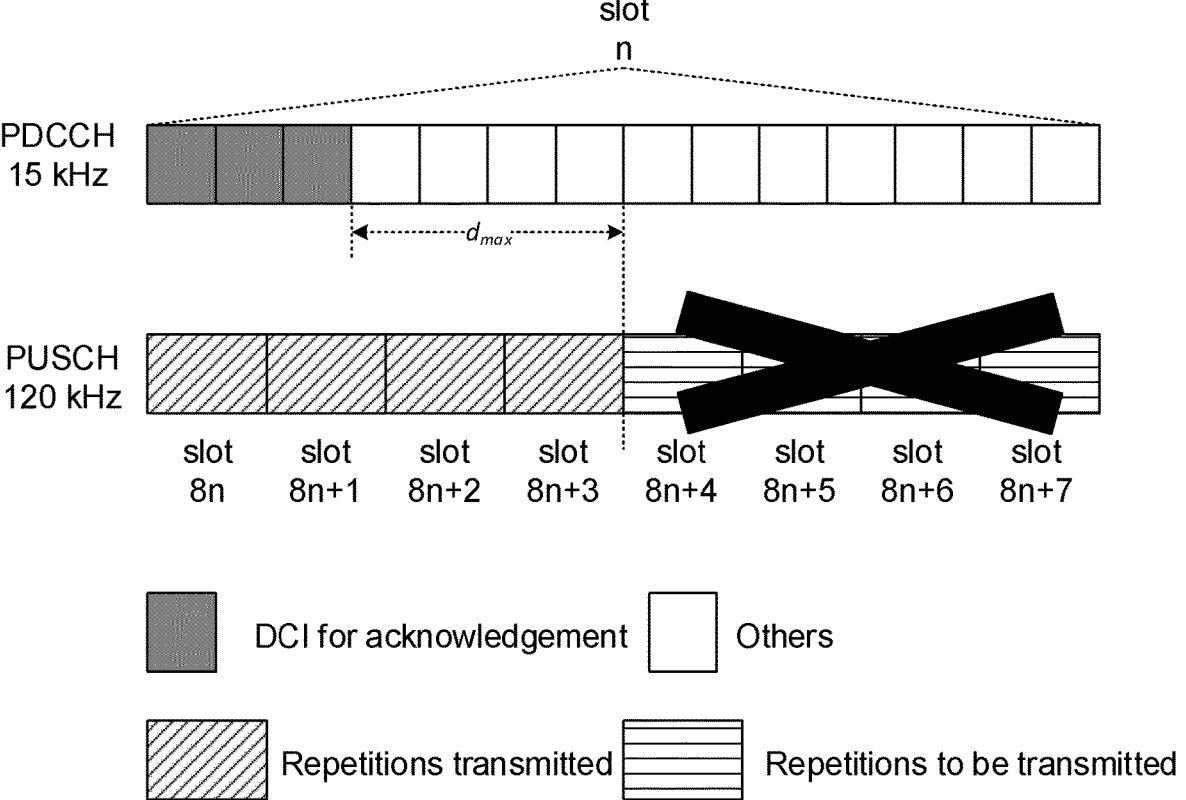
FIG. 6 is a diagram illustrating another exemplary slot structure for early termination of uplink data transmission according to another embodiment of the present disclosure.

Option 2: a maximum separation ($d_{max}$) between the end of the last symbol of acknowledgement PDCCH and the end of the last transmitted symbol of the PUSCH repetition can be RRC/L1 configured or fixed in specification. $d_{max}$ can be in the unit of OFDM symbols based on e.g. PDCCH or PUSCH SCS. UE 210 will terminate PUSCH transmission no later than delta symbols after the last symbol of PDCCH for transmission of the DCI, for example, as shown in FIG. 5 and FIG. 6.

Option 3: UE 210 will stop transmission of the repetition at least starting from slot n+X. The value of X can be RRC/L1 configured or fixed.

Further, $d_{offset}$ in Option 1, $d_{max}$ in Option 2, and X in Option 3 may vary depending on SCS, which can be RRC/L1 configured or fixed to be either UL or DL SCS.

For example, PDCCH SCS may be used, or the larger one of SCSs of UL and DL may be used.

For an example of option 2 with unpaired spectrum, as illustrated in FIG. 5, $d_{max}$ may be the maximum gap between the end of PDCCH and the end of the last transmitted symbol of the PUSCH repetition. The UE 210 is transmitting a PUSCH repetition when it decodes the acknowledgement PDCCH, and then the UE 210 may stop its UL transmission starting from $d_{max}$ symbols after the end of PDCCH.

FIG. 6 shows the scenario with a paired spectrum and with PDCCH SCS of 15 kHz and PUSCH SCS of 120 kHz. UE 210 is scheduled with 8 PUSCH repetitions starting from slot 8n. Acknowledgement PDCCH ends at the third symbol in a slot n. $d_{max}$ is 4 OFDM symbols in PDCCH's SCS. UE 210 may stop its UL transmission after the end of the $7^{th}$ OFDM symbol of DL SCS, which corresponds to the end of slot 8n+3 in UL carrier. The later four PUSCH repetitions (i.e. slots 8n+4 to 8n+7) may be cancelled or omitted.

Enhancement to PUSCH repetition Type A and B

5G NR Rel-15 introduced PUSCH slot aggregation, which is called PUSCH repetition Type A. It has some restrictions when overlapping with DL transmission or higher L1 priority PUCCH/PUSCH or UCI which fails the timeline check. If semi-static DL/UL assignment configuration of a slot has direction conflicts with scheduled DCI granted multi-slot PUSCH transmission, the PUSCH repetition in that slot is not received/transmitted, i.e. the effective number of repetitions reduces. Further, 5G NR R16 introduced 2-level PHY priority index. The lower-priority PUCCH/PUSCH is not transmitted if it is time-overlapped with a higher-priority PUCCH/PUSCH transmission. If PUSCH repetition overlaps with a UCI and UCI fails timeline check, this is regarded as an error case and UCI cannot be multiplexed on PUSCH. For PUSCH repetition Type B, the latter two restrictions also apply.

Regarding above restrictions, some embodiments of the present disclosure provide methods to improve PUSCH repetitions Type A and B.

In some embodiments, for PUSCH repetition Type A, if a portion of one PUSCH nominal repetition overlaps with DL or invalid symbols, the nominal repetition can be segmented around DL/invalid symbols, leading to a non-overlapping actual repetition and overlapping actual repetition.

In some embodiments, the UE 210 may determine invalid symbol(s) for PUSCH repetition Type A transmission as follows:

DL symbols;

UCI which fails timeline check and can't be multiplexed on the PUSCH repetition;

PUCCH/PUSCH with higher PHY priority than the PUSCH repetition; and/or

Symbols with a higher layer parameter InvalidSymbolPattern having a value of 1.

In some other embodiments, the non-overlapping actual repetition can still be sent. One or more methods can be applied to the overlapping actual repetition.

Option 1: overlapping actual repetition is multiplexed with overlapping UCI;

Option 2, overlapping actual repetition is omitted.

FIG. 7 is a diagram illustrating an exemplary slot structure for resolving conflict between multiple uplink data transmissions according to an embodiment of the present disclosure. As illustrated in (a) of FIG. 7, four PUSCH repetitions are scheduled from the slot n to n+3. HARQ is scheduled in the slot n+1, but it fails timeline check. In such a case, the PUSCH nominal repetition 2 is segmented around HARQ and HARQ is multiplexed on the overlapped part of the repetition 2. Further, as shown in (b) of FIG. 7, HARQ in the slot n+1 overlaps with PUSCH nominal repetition in the slot n+1 and HARQ may have a higher L1 priority, so the PUSCH repetition 2 is segmented around HARQ and the overlapping PUSCH is dropped or omitted.

In NR Rel-16, for PUSCH repetition Type B, a nominal repetition may be segmented around invalid symbols, configured as DL symbols or by higher layer parameters InvalidSymbolPattern. In some embodiments of the present disclosure, some other symbols can also be regarded as invalid.

For example, the UE 210 may determine invalid symbol(s) for PUSCH repetition Type B transmission as follows:

UCI which fails timeline check and can't be multiplexed on the PUSCH repetition; and/or PUCCH/PUSCH with higher PHY priority than the PUSCH repetition.

In some embodiments, the non-overlapping actual repetition can still be sent. One or more methods can be applied to the overlapping actual repetition.

Option 1: overlapping actual repetition is multiplexed with overlapping UCI; or

Option 2: overlapping actual repetition is omitted.

UE Based Coverage Determination/Indication and UE Determined Number of PUSCH Repetitions In some embodiments, gNB 220 may set the various (SINR, RSRP) thresholds level so UE 210 may know if it is in cell edge with poor reception. UE 210 may determine based upon its Power Headroom Report (PHR) and/or Reference Signal Receveid Power (RSRP) report. Further, Radio Resource Management (RRM) measurements of serving and neighbor cells may enable UE 210 to determine the coverage level of the serving cell. In another embodiment, whenever UE 210 is in poor coverage, it may indicate to the gNB 220 by using a specific coverage bit indicator, for example, in a MAC CE or specific UCI.

This mechanism would basically eliminate the need of UE 210 sending large KPI/measurement results to the gNB 220 when it is in poor coverage. Rather only a single bit indicator in UL DCI or MAC CE or one bit in RRC could be used to signal to gNB 220. The gNB 220 may then provide UL grant to accommodate/facilitate several repetitions which the UE 210 may use.

Further, with channel reciprocity, the gNB 220 may not trigger UE 210 to send CSI report. Instead, gNB 220 may estimate UL channel based on SRS, which is used as basis for PUSCH and PDSCH scheduling. If gNB 220 pessimistically estimates the channel, it may schedule excessive number of PUSCH/PDSCH repetitions. If UE 210 starts decoding some PDSCH repetitions it has received while receiving the remaining ones, it may find out the gNB schedules unnecessary PDSCH repetitions. Then the problem of excessive PUSCH repetitions is likely to happen. Likewise, not enough number of PUSCH and/or PDSCH repetitions may happen together.

In such case, UE 210 can decide the number of repetitions to be used for uplink data transmission, for example, based upon channel reciprocity. That is, how many repetitions in DL are required for the UE 210 to successfully decode the data. It can identify the UL desired number of repetitions from channel reciprocity. In other words, due to channel reciprocity between uplink transmission (e.g., PUSCH transmission) and downlink transmission (e.g., PDSCH transmission), the UL desired number of repetitions may be determined at least partially based on corresponding DL number of repetitions, or vice versa.

In some embodiments, in some cases, the gNB 220 may provide the formula and/or parameters on how to deduce the UL repetition number. For example, the number of repetitions for a PUSCH transmission may be determined at least partially based on at least one of the number of repetitions needed for downlink transmission, one or more compensation factors for channel reciprocity, and/or the maximum configured repetition number by network. In some embodiments, the one or more compensation factors comprise at least one of: TDD configuration comprising number of available UL subframes and/or DL/UL subframe ratio; Transmit power difference between terminal device's transmit power and the network node's transmit power; and UL/DL Modulation & Coding Scheme (MCS), beamforming gain, and/or antenna gain.

Further, in some embodiments, UE 210 may identify or further compensate based upon UE coverage level (RSRP) and PHR, etc. In some embodiments, the gNB 220 may configure the UE 210 with multiple candidate numbers of PUSCH repetitions for the UE 210 to choose, and it is then up to the UE 210 to select one of them. UL time and frequency resources for the UE 210 may be allocated according to the maximum of the configured numbers.

For example, the gNB 220 may reserve resource for up to 16 repetitions (maxConfiguredByNetwork). The UE 210 may then try to ascertain what the optimum UL repetition required is. If it is less than maxConfiguredByNetworkthen the UE 210 may use that.

Figure 8:
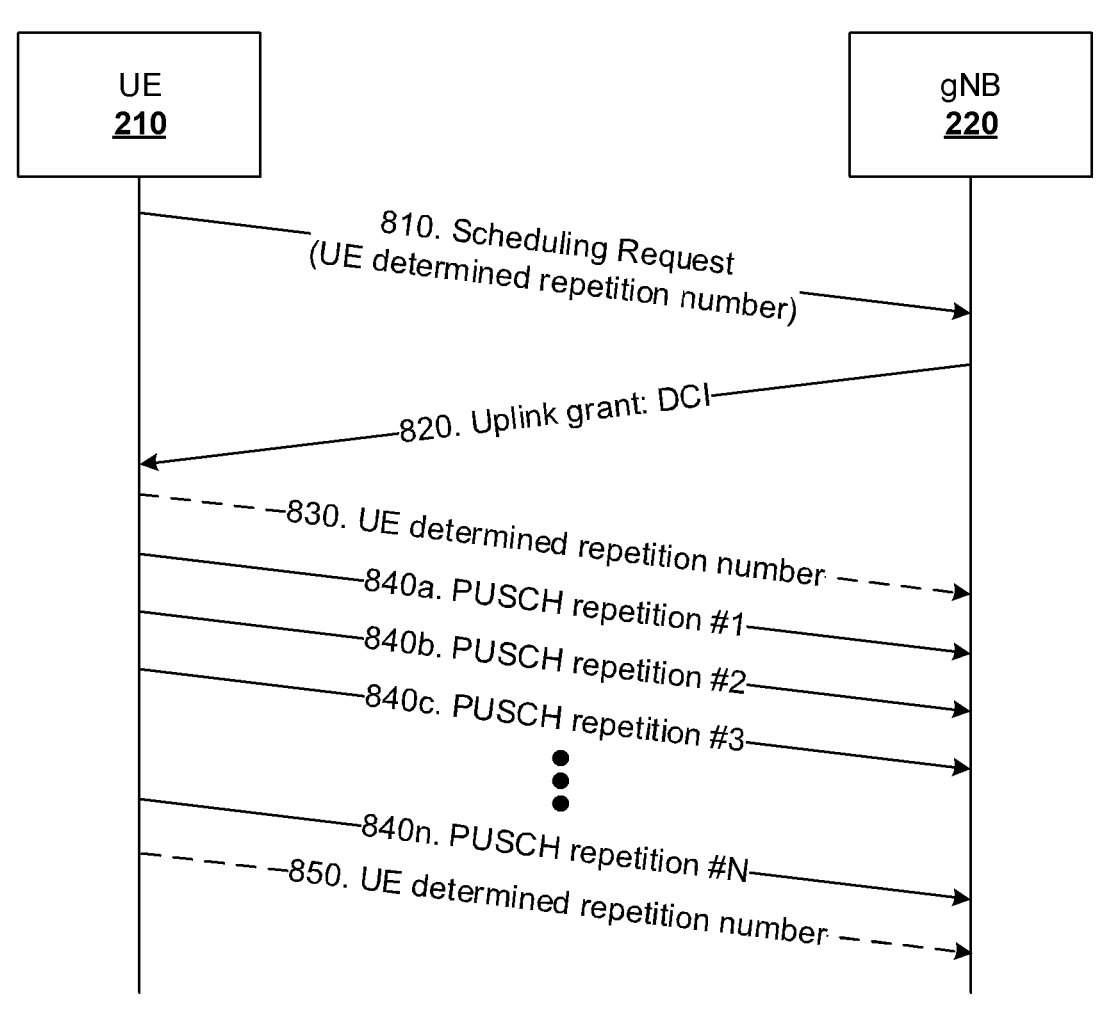
FIG. 8 is a diagram illustrating an exemplary method for reporting UE determined repetition number for uplink data transmission according to an embodiment of the present disclosure.

In another embodiment, the indicator of the UE-determined number of PUSCH repetitions can be sent at different times with different meanings, for example, shown in FIG. 8. If it is sent together with SR (e.g., step 810), it can indicate PUSCH repetition number that UE 210 will need. Then the gNB 220 can schedule PUSCH repetition accordingly. If the UE 210 determines the number after receiving UL grant and before starting PUSCH transmission, the UE 210 can inform the gNB 220 of its determined number before it starts PUSCH transmission (e.g., step 830). The number indicates how many PUSCH repetitions that the UE 210 will send. Further, the indication can also be sent when the UE 210 finishes its determined number of repetitions (e.g., step 850), then it means how many PUSCH repetition that the UE 210 has sent. In other words, the step 810 may be an operation for UE-aided repetition determination, and the steps 830 and 950 may be operations for UE-determined early termination. Further, in some embodiments, the UE 210 may report its determined number for multiple times which may be different from each other, for example, due to different channel conditions, and these determined numbers may function differently.

If there is any issue on the gNB 220 side to decode the UE 210-determined PUSCH data; then in another embodiment, the gNB 220 may disable the UE 210 based coverage determination and repetition and thereafter configure the parameters in the legacy mechanism.

After the gNB 220 schedules PUSCH repetition with dynamic or configured grant, if the UE 210 determines a larger number of PUSCH repetitions is needed than the maximum number the gNB 220 has configured, the UE 210 can choose the maximum configured number and send its determined number of PUSCH repetitions to the gNB 220. The gNB 220 can trigger retransmission of the TB to complement the additional repetitions even before it receives all repetitions of initial transmission.

For PUSCH with configured grant, this mechanism can be also used such as for VoIP services. The gNB 220 can send dynamic grant for this TB using retransmission method or may alter/adapt the configured grant accordingly. The UE 210 may do so only when it identifies that previous repetition number may not work or is not ideal; thus, not disrupt the CG (configured grant) resources too much or very often.

In another embodiment, for PUSCH repetition with a dynamic grant or configured grant, the gNB 220 can schedule a UL grant for retransmission of the TB before it receives all repetitions of initial transmission of the TB from the UE 210, and then the UE 210 may send the PUSCH repetitions of the TB in initial transmission and retransmission in parallel.

Frequency-Domain Based Solutions

In NR up to Rel-16, frequency hopping of PUSCH is supported with only two frequency hops. The UE 210 may switch PUSCH transmission in two frequency hops according to the time duration of a frequency hop, where the time-domain duration of a frequency hop is one half-slot, one slot, or one repetition for intra-slot, inter-slot, and inter-repetition frequency hopping, respectively. A frequency offset in the number of PRBs between the two frequency hops, is RRC or L1 configured. However, the maximum of two frequency hops and the configured offset between hops may not fully exploit frequency diversity.

In some embodiments, one or more of the following frequency hopping parameters for PUSCH repetition can be configured by RRC or L1 signaling to support multiple frequency hopping locations:

N, Number of frequency hopping locations;

Frequency hopping offset $RB_{offset}$ or frequency hopping offset list;

Duration of a hop, which can be a number of consecutive slots or nominal repetitions using the same frequency hop.

In some embodiments, a default frequency offset and/or a default time duration of a frequency hop can be defined. For example, a default offset can be provided, e.g.

$$RB_{offset} = \text{floor(size of active } BWP$$

$$N_{BWP}^{size}$$

/number of frequency hopping locations).

For another example, a default time duration of a hop can be the same as the time duration of a frequency hop defined in NR Rel-15 and Rel-16.

For example, PUSCH repetition Type A with eight repetitions can be configured with four frequency hopping locations and two slots as the duration of a hop, the UE 210 may transmit eight PUSCH repetitions with starting RB $RB_{start}$ in f0, f0, f1, f1, f2, f2, f3, f3. Since frequency hopping offset is not configured, the default $RB_{offset}$=floor (BWP size/4). Multiple hops evenly distribute across the active BWP.

In some embodiments, multiple configurations for the set of abovementioned parameters, can be activated for transmission of one TB. This method is pursued especially when a large number of PUSCH repetitions have been supported so that the gNB 220 may use different configurations in different time duration to achieve diversity gain in both time domain and frequency domain. For example, if two configurations are activated, the two configurations are used in first half number of slots/repetitions and the latter half, respectively.

In some embodiments, the starting RB of a hop or a frequency location can be a function of:

the start RB of a first or a predetermined hop/frequency location;

and/or the frequency hop id, where the frequency hop id is the identifier to identify the hop.

As an example, the start PRB of a hop n is defined with following formula:

$$RB_{start}(n) = (RB_{start}(0) + n * RB_{offset}) \bmod N_{BWP}^{size}, n = 0, 1, \ldots, N - 1$$

where $RB_{start}(n)$ refers to the starting RB of the hop n, $RB_{start}(0)$ refers to the starting RB of the hop 0, N is the total number of frequency hops, $$N_{BWP}^{size}$$

is the size of the active uplink Bandwidth Part (BWP) in which the PUSCH transmission is transmitted.

In some embodiments, if the starting RB of a hop and the number of allocated RBs for the UE 210 cause the ending RB of a hop to exceed BWP boundary, the UE 210 can either set the starting RB of the hop such that the last RB of the hop is the last PRB of BWP or set the starting RB of the hop as the first RB of the BWP. This can be specified in the specification to allow the UE 210 to change the frequency locations so that a consecutive number of PRBs are used for transmission at one time. This is needed especially when a DFT-s-OFDM waveform is applied to avoid non-contiguous RB for one hop. In some embodiments, it's up to gNB to ensure the number of allocated RBs for each hop are consecutive RBs.

Spatial Domain Based Solutions

In NR Rel-15 and R16, TX diversity is transparent to the receiver, which means the receiver algorithm will not depend on whether TX diversity is applied or not.

When repetition is applied on PUSCH on the transmitter side, the repetitions may not be able to coherently combined which means soft combining is always needed, while when TX diversity is not applied on PUSCH, some coherent IQ combining on top of some minimum number of soft combining may improve the performance with less receiver complexity since less number of demodulation is needed in the latter case. Note that a fixed phase offset, depending on the time distance between 2 repetitions can be estimated and compensated between 2 repetitions before coherent combining mentioned in the following embodiments.

In one embodiment, a TX diversity flag is signaled from the gNB 220 to one or multiple UEs comprising the UE 210, wherein the signaling can be in RRC signaling, e.g. SIB1 or UE dedicated signaling or layer signaling, e.g. in DCI or in a Random Access Response (RAR). With the flag indicated, receiver, i.e. gNB 220, is able to determine whether a coherent combining or soft combining can be used between repetitions.

In some embodiments, coherent IQ combining among a set of the repetitions can be used in the receiver (e.g. the gNB 220) when TX diversity flag is set to false, wherein the set of the repetitions can be a subset of the repetitions or all repetitions. In another embodiment, whether coherent combining or soft combining is used to receive the set of PUSCH repetitions may depend on whether frequency hopping is used between different repetitions. In some embodiments, repetitions on the same hop, i.e. on the same PRBs can be coherently combined. In some embodiments, whether coherent combining is used may depend on the distance or gap between the 2 repetitions, wherein an experienced threshold depending on the channel conditions for different deployments can be predetermined to determine the combining type. For example, the threshold may be 2 slots in some embodiments, and when the time distance between 2 repetitions are no more than 2 slots, a coherent combining may be used, while soft combining may be used for combining between multiple 2-slot time durations.

For example, for a PUSCH transmission with four repetitions, r1, r2, r3, and r4, r1 and r2 can be combined by using coherence IQ combining, r3 and r4 can be combined also by using coherence IQ combining, and a soft combining may be used for combining the combination of r1 and r2 and the combination of r3 and r4.

With the multiple solutions, either alone or in any appropriate combination, the uplink data transmission may be enhanced in terms of latency, throughput, overhead, etc.

FIG. 9 is a flow chart of an exemplary method 900 for enhancing uplink data transmission according to an embodiment of the present disclosure. The method 900 may be performed at a terminal device (e.g. the UE 110 or 210). The method 900 may comprise step S910 and step S920. However, the present disclosure is not limited thereto. In some other embodiments, the method 900 may comprise more steps, less steps, different steps or any combination thereof. Further the steps of the method 900 may be performed in a different order than that described herein. Further, in some embodiments, a step in the method 900 may be split into multiple sub-steps and performed by different entities, and/or multiple steps in the method 900 may be combined into a single step.

The method 900 may begin at step S910 where a first message indicating at least one parameter for a Physical Uplink Shared Channel (PUSCH) transmission may be received from a network node.

At step S920, the PUSCH transmission may be transmitted to the network node at least partially based on the first message.

In some embodiments, the first message indicates a parameter of the PUSCH transmission in time domain. In some embodiments, the first message indicates a number of repetitions for the PUSCH transmission. In some embodiments, the number is greater than 16. In some embodiments, the number is different from any of 1, 2, 3, 4, 7, 8, 12, and 16. In some embodiments, the parameter has more than 8 candidate values and no more than 16 candidate values.

In some embodiments, during the step of transmitting, to the network node, the PUSCH transmission at least partially based on the first message, the method further comprises: receiving, from the network node, a second message indicating that the PUSCH transmission is successfully decoded at the network node before the transmission of all the repetitions for the PUSCH transmission is completed; and prohibiting or skipping the transmission of the remaining repetitions. In some embodiments, the first message is a first Physical Downlink Control Channel (PDCCH) message carrying Downlink Control Information (DCI) with a format for uplink (UL) grant, the second message is a second PDCCH message carrying DCI. In some embodiments, the second message is a DCI format 0_0, DCI format 0_1, or DCI format 0_2 PDCCH message having its Cyclic Redundancy Check (CRC) scrambled with the terminal device's Cell-Radio Network Temporary Identifier (C-RNTI), and the second message comprises a DCI field which is defined as a bitmap, wherein the bitmap indicates successful decoding of the PUSCH transmission which is transmitted with one of a group of Hybrid Automatic Repeat Request (HARQ) process numbers, the group being associated with at least one bit of the bitmap. In some embodiments, the grouping of HARQ process numbers is predefined, semi-persistently configured via previous Radio Resource Control (RRC) signaling, or dynamically configured via the second message.

In some embodiments, the second message is a DCI format 0_0, DCI format 0_1, or DCI format 0_2 PDCCH message having its Cyclic Redundancy Check (CRC) scrambled with a dedicated Radio Network Temporary Identifier (RNTI), which is previously assigned by the network node to the terminal device and different from the terminal device's Cell-RNTI (C-RNTI), and the second message has the CRC scrambled with the dedicated RNTI which indicates successful decoding of the PUSCH transmission. In some embodiments, the second message is a DCI format 0_0, DCI format 0_1, or DCI format 0_2 PDCCH message, and the second message comprises a first Hybrid Automatic Repeat Request (HARQ) process number which indicates successful decoding of the PUSCH transmission that is transmitted with a second HARQ process number different from and associated with the first HARQ process number. In some embodiments, the second message is a DCI format 0_0, DCI format 0_1, or DCI format 0_2 PDCCH message, and the second message comprises a toggled New Data Indicator (NDI) field which indicates successful decoding of the PUSCH transmission of a same HARQ process number.

In some embodiments, the first message is a Physical Downlink Shared Channel (PDSCH) message carrying a Radio Resource Control (RRC) configured UL grant for the terminal device, the second message is a PDCCH message carrying DCI. In some embodiments, the second message is a DCI format 0_0, DCI format 0_1, or DCI format 0_2 PDCCH message having its Cyclic Redundancy Check (CRC) scrambled with the terminal device's Configured Scheduling-Radio Network Temporary Identifier (CS-RNTI), and at least one HARQ process number is comprised in the second message. In some embodiments, the second message has a DCI state which indicates successful decoding of the PUSCH transmission when the RRC configured UL grant is a Type 1 configured grant. In some embodiments, the DCI state is that the NDI field of the second message has a value of 0. In some embodiments, the second message has a payload which indicates successful decoding of the PUSCH transmission when the RRC configured UL grant is a Type 2 configured grant. In some embodiments, the second message is a DCI format 0_0, DCI format 0_1, or DCI format 0_2 PDCCH message having its Cyclic Redundancy Check (CRC) scrambled with the terminal device's Configured Scheduling-Radio Network Temporary Identifier (CS-RNTI), and the second message comprises an extended NDI field which comprises more than one bit, wherein at least one of values of the extended NDI field indicates successful decoding of the PUSCH transmission. In some embodiments, the second message is a DCI format 0_0, DCI format 0_1, or DCI format 0_2 PDCCH message having its Cyclic Redundancy Check (CRC) scrambled with the terminal device's Configured Scheduling-Radio Network Temporary Identifier (CS-RNTI) or C-RNTI, and the second message has a field which indicates successful decoding of the PUSCH transmission.

In some embodiments, the first message is a first Physical Downlink Shared Channel (PDSCH) message carrying a first Radio Resource Control (RRC) configured UL grant for the terminal device, the first RRC configured UL grant comprising a first HARQ process number, wherein the second message is a second PDCCH message carrying DCI for the terminal device, the second DCI comprising a second HARQ process number which is different from the first HARQ process number and indicates successful decoding of the PUSCH transmission which is transmitted with the first HARQ process number.

In some embodiments, the second message further indicates at least one of: the number of repetitions of the PUSCH transmission which has been received by the network node; and the number of repetitions of the PUSCH transmission which can be omitted.

In some embodiments, the step of prohibiting the transmission of the remaining repetitions comprises: when time division duplex (TDD) mode is used, stopping the PUSCH transmission at a temporal location as follows:

$$S_{stop} = S_{PDCCH} + d_{delay} + d_{offset}$$

where $S_{stop}$ refers to the temporal location where the PUSCH transmission is stopped, $S_{PDCCH}$ refers to the temporal location where the last symbol of the second message is received, $d_{delay}$ refers to processing delay for the second message, and $d_{offset}$ refers to an offset value for error tolerance.

In some embodiments, the step of prohibiting the transmission of the remaining repetitions comprises: when time division duplex (TDD) mode is used, stopping the PUSCH transmission at a temporal location as follows:

$$S_{stop} = S_{PDCCH} + d_{max}$$

where $S_{stop}$ refers to the temporal location where the PUSCH transmission is stopped, $S_{PDCCH}$ refers to the temporal location where the last symbol of the second message is received, and $d_{max}$ refers to a maximum separation between $S_{stop}$ and $S_{PDCCH}$.

In some embodiments, the step of prohibiting the transmission of the remaining repetitions comprises: when frequency division duplex (FDD) mode is used, stopping the PUSCH transmission from the first symbol in PUSCH slot $S_{stop}$, which corresponds to the PDCCH slot $S_{PDCCH}$, in which the last symbol of the second message is received, plus X which refers to a configured or fixed number of PDCCH slots during which the second message is processed. In some embodiments, each of $d_{offset}$, $d_{max}$, and X is variable based on subcarrier space (SCS). In some embodiments, whether UL SCS or DL SCS is used for determining $d_{offset}$, $d_{max}$ and/or X is either RRC/L1 configured or fixed to be either UL or DL SCS.

In some embodiments, the step of transmitting, to the network node, the PUSCH transmission at least partially based on the first message comprises: transmitting, to the network node, a repetition of the PUSCH transmission which is segmented around one or more invalid symbols which are scheduled to be transmitted or received simultaneously with the repetition. In some embodiments, when the repetitions of the PUSCH transmission are type A repetitions, the invalid symbols comprise at least one of: a downlink (DL) symbol; a symbol of Uplink Control Information (UCI) which fails timeline check and cannot be multiplexed with the repetition; a symbol of another PUCCH or PUSCH transmission with a higher PHY priority than that of the repetition; and a symbol for which its corresponding higher layer parameter InvalidSymbolPattern has a value of 1. In some embodiments, when the repetitions of the PUSCH transmission are type B repetitions, the invalid symbols comprise at least one of: a symbol of Uplink Control Information (UCI) which fails timeline check and cannot be multiplexed with the repetition; and a symbol of another PUCCH or PUSCH transmission with a higher PHY priority than that of the repetition. In some embodiments, a segmented part of the repetition which is overlapped with the one or more invalid symbols is transmitted in a manner such that the segmented part is multiplexed with the one or more invalid symbols when the repetition has a same PHY layer priority as that of the one or more invalid symbols.

In some embodiments, before the step of transmitting, to the network node, the PUSCH transmission at least partially based on the first message, the method further comprises: measuring downlink channel quality and/or determining uplink transmit power; and determining whether the terminal device is in good or poor coverage at least partially based on the measured downlink channel quality and/or the determined uplink transmit power. In some embodiments, the method further comprises: receiving, from the network node, a threshold; and wherein the step of determining whether the terminal device is in good or poor coverage at least partially based on the measured downlink channel quality and/or the determined uplink transmit power comprises: determining whether the terminal device is in good or poor coverage by comparing the measured downlink channel quality and/or the determined uplink transmit power with the threshold. In some embodiments, the method further comprises: transmitting, to the network node, a third message indicating whether the terminal device is in good or poor coverage. In some embodiments, when the transmission of the third message occurs before the reception of the first message, the first message configures a parameter indicating a number of repetitions for the PUSCH transmission, and the first message is determined at least partially based on the third message.

In some embodiments, before the step of transmitting, to the network node, the PUSCH transmission at least partially based on the first message, the method further comprises: measuring downlink channel quality; and determining a number of repetitions for the PUSCH transmission at least partially based on the measured downlink channel quality. In some embodiments, the number of repetitions for the PUSCH transmission is determined at least partially based on at least one of:—the number of repetitions needed for downlink transmission;—one or more compensation factors for channel reciprocity, and—the maximum configured repetition number by network. In some embodiments, the one or more compensation factors comprise at least one of:— TDD configuration comprising number of available UL subframes and/or DL/UL subframe ratio;—Transmit power difference between terminal device's transmit power and the network node's transmit power; and—UL/DL Modulation & Coding Scheme (MCS), beamforming gain, and/or antenna gain. In some embodiments, the number of repetitions for the PUSCH transmission is determined from multiple candidate numbers configured by the network node, the multiple candidate numbers comprising the maximum configured repetition number. In some embodiments, after the step of determining the number of repetitions, the method further comprises transmitting, to the network node, the determined repetition number to indicate at least one of:—a number of repetitions needed for the PUSCH transmission by the terminal device when the transmission of the determined number occurs before the reception of the first message;—a number of repetitions to be transmitted for the PUSCH transmission by the terminal device when the transmission of the determined number occurs after the reception of the first message and before the PUSCH transmission; and—a number of repetitions which has been transmitted for the PUSCH transmission by the terminal device when the transmission of the determined number occurs after the transmission of the determined number of repetitions for the PUSCH transmission. In some embodiments, when the determined number of repetitions is greater than the maximum configured repetition number, the method further comprises: transmitting, to the network node, the maximum configured repetitions. In some embodiments, the method further comprises: receiving, from the network node, a UL grant for retransmission of the PUSCH transmission; and transmitting, to the network node, the retransmission of the PUSCH transmission. In some embodiments, the UL grant for retransmission is determined at least partially based on the determined repetition number. In some embodiments, the reception of the UL grant for retransmission occurs before the transmission of all of the maximum configured repetitions.

In some embodiments, the first message indicates a parameter of the PUSCH transmission in frequency domain. In some embodiments, the first message indicates a frequency hopping configuration. In some embodiments, the frequency hopping configuration further comprises at least one of:—at least a number of hops, the number being greater than 2;—frequency hopping offsets or frequency hopping offset list; and—duration of a hop.

In some embodiments, the first message indicates multiple different frequency hopping configurations, wherein the PUSCH transmission is transmitted with multiple repetitions, and at least two of the multiple repetitions are transmitted with the different frequency hopping configurations, respectively. In some embodiments, the starting resource block (RB) of a hop is determined at least partially based on the start RB of a first or a predetermined hop and/or the frequency hop ID of the hop. In some embodiments, the starting RB of a hop n is defined as follows:

$$RB_{start}(n) = (RB_{start}(0) + n * RB_{offset}) \bmod N_{BWP}^{size}, n = 0, 1, \ldots, N - 1$$

where $RB_{start}(n)$ refers to the starting RB of the hop n, $RB_{start}(0)$ refers to the starting RB of the hop 0, N is the total number of frequency hops, $$N_{BWP}^{size}$$

is the size of the active uplink Bandwidth Part (BWP) in which the PUSCH transmission is transmitted.

In some embodiments, when the calculated starting RB of the hop n and the number of allocated RBs for the terminal device cause the ending RB of the hop n to exceed BWP boundary, the starting RB of the hop n is changed such that the last RB of the hop n is the last RB of the BWP or the starting RB of the hop n is set as the first RB of the BWP. In some embodiments, when the calculated starting RB of the hop n and the number of allocated RBs for the terminal device cause the ending RB of the hop n to exceed BWP boundary, the first message further indicates consecutive RBs which are allocated to be used for terminal device's frequency hopping.

In some embodiments, the first message indicates a parameter of the PUSCH transmission in spatial domain. In some embodiments, the first message further indicates whether transmit diversity is to be used for the PUSCH transmission.

FIG. 10 is a flow chart of an exemplary method 1000 for enhancing uplink data transmission according to an embodiment of the present disclosure. The method 1000 may be performed at a network node (e.g. the gNB 120 or 220). The method 1000 may comprise step S1010 and step S1020. However, the present disclosure is not limited thereto. In some other embodiments, the method 1000 may comprise more steps, less steps, different steps or any combination thereof. Further the steps of the method 1000 may be performed in a different order than that described herein. Further, in some embodiments, a step in the method 1000 may be split into multiple sub-steps and performed by different entities, and/or multiple steps in the method 1000 may be combined into a single step.

The method 1000 may begin at step S1010 a first message indicating at least one parameter for a Physical Uplink Shared Channel (PUSCH) transmission may be transmitted to a terminal device.

At step S1020, the PUSCH transmission may be received from the terminal device at least partially based on the first message.

In some embodiments, the first message indicates a parameter of the PUSCH transmission in time domain. In some embodiments, the first message indicates a first number of repetitions for the PUSCH transmission. In some embodiments, the first number is greater than 16. In some embodiments, the first number is different from any of 1, 2, 3, 4, 7, 8, 12, and 16. In some embodiments, the parameter has more than 8 candidate values and no more than 16 candidate values.

In some embodiments, the step of receiving, from the terminal device, the PUSCH transmission at least partially based on the first message comprises: receiving the PUSCH transmission with a second number of repetitions, the second number being less than the first number, wherein the method further comprises: transmitting, to the terminal device, a second message indicating that the PUSCH transmission is successfully decoded at the network node in response to determining that the PUSCH transmission is successfully decoded with the received second number of repetitions.

In some embodiments, the first message is a first Physical Downlink Control Channel (PDCCH) message carrying Downlink Control Information (DCI) with a format for uplink (UL) grant, the second message is a second PDCCH message carrying DCI. In some embodiments, the second message is a DCI format 0_0, DCI format 0_1, or DCI format 0_2 PDCCH message having its Cyclic Redundancy Check (CRC) scrambled with the terminal device's Cell-Radio Network Temporary Identifier (C-RNTI), and the second message comprises a DCI field which is defined as a bitmap, wherein the bitmap indicates successful decoding of the PUSCH transmission which is transmitted with one of a group of Hybrid Automatic Repeat Request (HARQ) process numbers, the group being associated with at least one bit of the bitmap. In some embodiments, the grouping of HARQ process numbers is predefined, semi-persistently configured via previous Radio Resource Control (RRC) signaling, or dynamically configured via the second message.

In some embodiments, the second message is a DCI format 0_0, DCI format 0_1, or a DCI format 0_2 PDCCH message having its Cyclic Redundancy Check (CRC) scrambled with a dedicated Radio Network Temporary Identifier (RNTI), which is previously assigned by the network node to the terminal device and different from the terminal device's Cell-RNTI (C-RNTI), and the second message has the CRC scrambled with the dedicated RNTI which indicates successful decoding of the PUSCH transmission. In some embodiments, the second message is a DCI format 0_0, DCI format 0_1, or DCI format 0_2 PDCCH message, and the second message comprises a first Hybrid Automatic Repeat Request (HARQ) process number which indicates successful decoding of the PUSCH transmission that is transmitted with a second HARQ process number different from and associated with the first HARQ process number. In some embodiments, the second message is a DCI format 0_0, DCI format 0_1, or DCI format 0_2 PDCCH message, and the second message comprises a toggled New Data Indicator (NDI) field which indicates successful decoding of the PUSCH transmission of a same HARQ process number. In some embodiments, the first message is a Physical Downlink Shared Channel (PDSCH) message carrying a Radio Resource Control (RRC) configured UL grant for the terminal device, the second message is a PDCCH message carrying DCI. In some embodiments, the second message is a DCI format 0_0, DCI format 0_1, or DCI format 0_2 PDCCH message having its Cyclic Redundancy Check (CRC) scrambled with the terminal device's Configured Scheduling-Radio Network Temporary Identifier (CS-RNTI), and at least one HARQ process number is comprised in the second message. In some embodiments, the second message has a DCI state which indicates successful decoding of the PUSCH transmission when the RRC configured UL grant is a Type 1 configured grant. In some embodiments, the DCI state is that the NDI field of the second message has a value of 0.

In some embodiments, the second message has a payload which indicates successful decoding of the PUSCH transmission when the RRC configured UL grant is a Type 2 configured grant. In some embodiments, the second message is a DCI format 0_0, DCI format 0_1, or DCI format 0_2 PDCCH message having its Cyclic Redundancy Check (CRC) scrambled with the terminal device's Configured Scheduling-Radio Network Temporary Identifier (CS-RNTI), and the second message comprises an extended NDI field which comprises more than one bit, wherein at least one of values of the extended NDI field indicates successful decoding of the PUSCH transmission.

In some embodiments, the second message is a DCI format 0_0, DCI format 0_1 or DCI format 0_2 PDCCH message having its Cyclic Redundancy Check (CRC) scrambled with the terminal device's Configured Scheduling-Radio Network Temporary Identifier (CS-RNTI) or C-RNTI, and the second message has a field which indicates successful decoding of the PUSCH transmission. In some embodiments, the first message is a first Physical Downlink Shared Channel (PDSCH) message carrying a first Radio Resource Control (RRC) configured UL grant for the terminal device, the first RRC configured UL grant comprising a first HARQ process number, wherein the second message is a second PDCCH message carrying DCI for the terminal device, the second DCI comprising a second HARQ process number which is different from the first HARQ process number and indicates successful decoding of the PUSCH transmission which is transmitted with the first HARQ process number.

In some embodiments, the second message further indicates at least one of: the number of repetitions of the PUSCH transmission which has been received by the network node; and the number of repetitions of the PUSCH transmission which can be omitted. In some embodiments, the step of receiving, from the terminal device, the PUSCH transmission at least partially based on the first message comprises: receiving, from the terminal device, a repetition of the PUSCH transmission which is segmented around one or more invalid symbols which are scheduled to be transmitted or received simultaneously with the repetition. In some embodiments, when the repetitions of the PUSCH transmission are type A repetitions, the invalid symbols comprise at least one of: a downlink (DL) symbol; a symbol of Uplink Control Information (UCI) which fails timeline check and cannot be multiplexed with the repetition; a symbol of another PUCCH or PUSCH transmission with a higher PHY priority than that of the repetition; and a symbol for which its corresponding higher layer parameter InvalidSymbolPattern has a value of 1. In some embodiments, when the repetitions of the PUSCH transmission are type B repetitions, the invalid symbols comprise at least one of: a symbol of Uplink Control Information (UCI) which fails timeline check and cannot be multiplexed with the repetition; and a symbol of another PUCCH or PUSCH transmission with a higher PHY priority than that of the repetition.

In some embodiments, a segmented part of the repetition which is overlapped with the one or more invalid symbols is transmitted in a manner such that the segmented part is multiplexed with the one or more invalid symbols when the repetition has a same PHY layer priority as that of the one or more invalid symbols. In some embodiments, the method further comprises: transmitting, to the terminal device, a threshold for determining whether the terminal device is in good or poor coverage.

In some embodiments, before the step of receiving, from the terminal device, the PUSCH transmission at least partially based on the first message, the method further comprises: receiving, from the terminal device, a third message indicating whether the terminal device is in good or poor coverage. In some embodiments, when the reception of the third message occurs before the transmission of the first message, the method further comprises: determining the first message at least partially based on the third message before the transmission of the first message.

In some embodiments, the first message configures a parameter indicating the maximum number of repetitions which can be transmitted for the PUSCH transmission.

In some embodiments, the first message configures a parameter indicating multiple candidate numbers of repetitions, comprising the maximum number of repetitions, which can be transmitted for the PUSCH transmission. In some embodiments, the method further comprises: receiving, from the terminal device, a determined repetition number to indicate at least one of:—a number of repetitions needed for the PUSCH transmission by the terminal device when the reception of the determined number occurs before the transmission of the first message;—a number of repetitions to be received for the PUSCH transmission by the network node when the reception of the determined number occurs after the transmission of the first message and before the PUSCH transmission; and—a number of repetitions which has been received for the PUSCH transmission by the network node when the reception of the determined number occurs after the reception of the determined number of repetitions for the PUSCH transmission.

In some embodiments, the method further comprises: transmitting, to the terminal device, a UL grant for retransmission of the PUSCH transmission; and receiving, from the terminal device, the retransmission of the PUSCH transmission. In some embodiments, the UL grant for retransmission is determined at least partially based on the determined repetition number. In some embodiments, the transmission of the UL grant for retransmission occurs before the reception of all of the maximum configured repetitions. In some embodiments, the first message indicates a parameter of the PUSCH transmission in frequency domain. In some embodiments, the first message indicates a frequency hopping configuration. In some embodiments, the frequency hopping configuration further comprises at least one of:—at least a number of hops, the number being greater than 2;—frequency hopping offsets or frequency hopping offset list; and—duration of a hop.

In some embodiments, the first message indicates multiple different frequency hopping configurations, wherein the PUSCH transmission is received with multiple repetitions, and at least two of the multiple repetitions are received with the different frequency hopping configurations, respectively. In some embodiments, the starting resource block (RB) of a hop is determined at least partially based on the start RB of a first or a predetermined hop and/or the frequency hop ID of the hop. In some embodiments, the starting RB of a hop n is defined as follows:

$$RB_{start}(n) = (RB_{start}(0) + n * RB_{offset}) \bmod N_{BWP}^{size}, n = 0, 1, \dots, N-1$$

where $RB_{start}(n)$ refers to the starting RB of the hop n, $RB_{start}(0)$ refers to the starting RB of the hop 0, N is the total number of frequency hops, $$N_{BWP}^{size}$$

is the size of the active uplink Bandwidth Part (BWP) in which the PUSCH transmission is transmitted.

In some embodiments, when the calculated starting RB of the hop n and the number of allocated RBs for the terminal device cause the ending RB of the hop n to exceed BWP boundary, the starting RB of the hop n is changed such that the last RB of the hop n is the last RB of the BWP or the starting RB of the hop n is set as the first RB of the BWP. In some embodiments, when the calculated starting RB of the hop n and the number of allocated RBs for the terminal device cause the ending RB of the hop n to exceed BWP boundary, the first message further indicate consecutive RBs which are allocated to be used for terminal device's frequency hopping.

In some embodiments, the first message indicates a parameter of the PUSCH transmission in spatial domain. In some embodiments, the first message indicates whether transmit diversity is to be used at the terminal device for the PUSCH transmission. In some embodiments, the method further comprises: performing IQ combining and/or soft combining on the received repetitions of the PUSCH transmission when the first message indicates that the transmit diversity is not to be used at the terminal device for the received repetitions for the PUSCH transmission; and performing soft combining alone on the received repetitions of the PUSCH transmission when the sixth indicator indicates that the transmit diversity is to be used at the terminal device for the received repetitions for the PUSCH transmission. In some embodiments, the method further comprises: performing IQ combining and/or soft combining on the received repetitions of the PUSCH transmission in response to determining that the received repetitions are received in a same hop or when frequency hopping is not enabled; and performing soft combining alone on the received repetitions of the PUSCH transmission in response to determining that the received repetitions are received in different hops. In some embodiments, the method further comprises: performing IQ combining and/or soft combining on the received repetitions of the PUSCH transmission in response to determining that the received repetitions are received in a same hop or different hops with a frequency gap less than or equal to a predetermined threshold or when frequency hopping is not enabled; and performing soft combining alone on the received repetitions of the PUSCH transmission in response to determining that the received repetitions are received in different hops with a frequency gap greater than the predetermined threshold.

Figure 11:
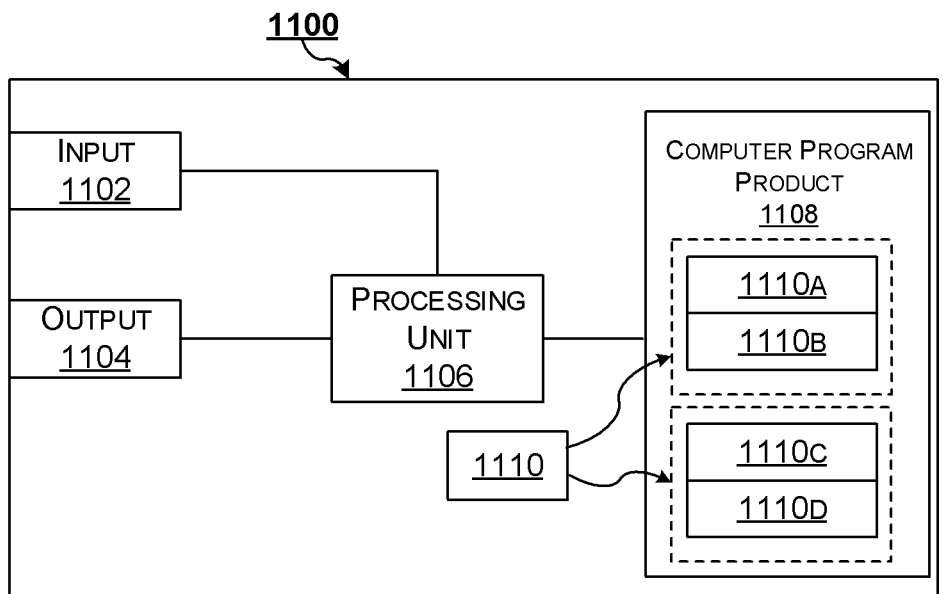
FIG. 11 schematically shows an embodiment of an arrangement which may be used in a terminal device or a network node according to an embodiment of the present disclosure.

FIG. 11 schematically shows an embodiment of an arrangement 1100 which may be used in a terminal device (e.g., the UE 110 or 210) or a network node (e.g. the gNB 120 or 220) according to an embodiment of the present disclosure. Comprised in the arrangement 1100 are a processing unit 1106, e.g., with a Digital Signal Processor (DSP) or a Central Processing Unit (CPU). The processing unit 1106 may be a single unit or a plurality of units to perform different actions of procedures described herein. The arrangement 1100 may also comprise an input unit 1102 for receiving signals from other entities, and an output unit 1104 for providing signal(s) to other entities. The input unit 1102 and the output unit 1104 may be arranged as an integrated entity or as separate entities.

Furthermore, the arrangement 1100 may comprise at least one computer program product 1108 in the form of a non-volatile or volatile memory, e.g., an Electrically Erasable Programmable Read-Only Memory (EEPROM), a flash memory and/or a hard drive. The computer program product 1108 comprises a computer program 1110, which comprises code/computer readable instructions, which when executed by the processing unit 1106 in the arrangement 1100 causes the arrangement 1100 and/or the network elements in which it is comprised to perform the actions, e.g., of the procedure described earlier in conjunction with FIG. 3 to FIG. 10 or any other variant.

The computer program 1110 may be configured as a computer program code structured in computer program modules 1110A and 1110B. Hence, in an exemplifying embodiment when the arrangement 1100 is used in a terminal device, the code in the computer program of the arrangement 1100 includes: a module 1110A for receiving, from a network node, a first message indicating at least one parameter for a Physical Uplink Shared Channel (PUSCH) transmission; and a module 1110B for transmitting, to the network node, the PUSCH transmission at least partially based on the first message.

Further, the computer program 1110 may be configured as a computer program code structured in computer program modules 1110C and 1110D. Hence, in an exemplifying embodiment when the arrangement 1100 is used in a network node, the code in the computer program of the arrangement 1100 includes: a module 1110C for transmitting, to a terminal device, a first message indicating at least one parameter for a Physical Uplink Shared Channel (PUSCH)

transmission; and a module 1110D for receiving, from the terminal device, the PUSCH transmission at least partially based on the first message.

The computer program modules could essentially perform the actions of the flow illustrated in FIG. 3 to FIG. 10, to emulate the terminal device or the network node. In other words, when the different computer program modules are executed in the processing unit 1106, they may correspond to different modules in the terminal device or the network node.

Although the code means in the embodiments disclosed above in conjunction with FIG. 11 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs).

The processor may also comprise board memory for caching purposes. The computer program may be carried by a computer program product connected to the processor.

The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the terminal device and/or the network node.

Figure 12:
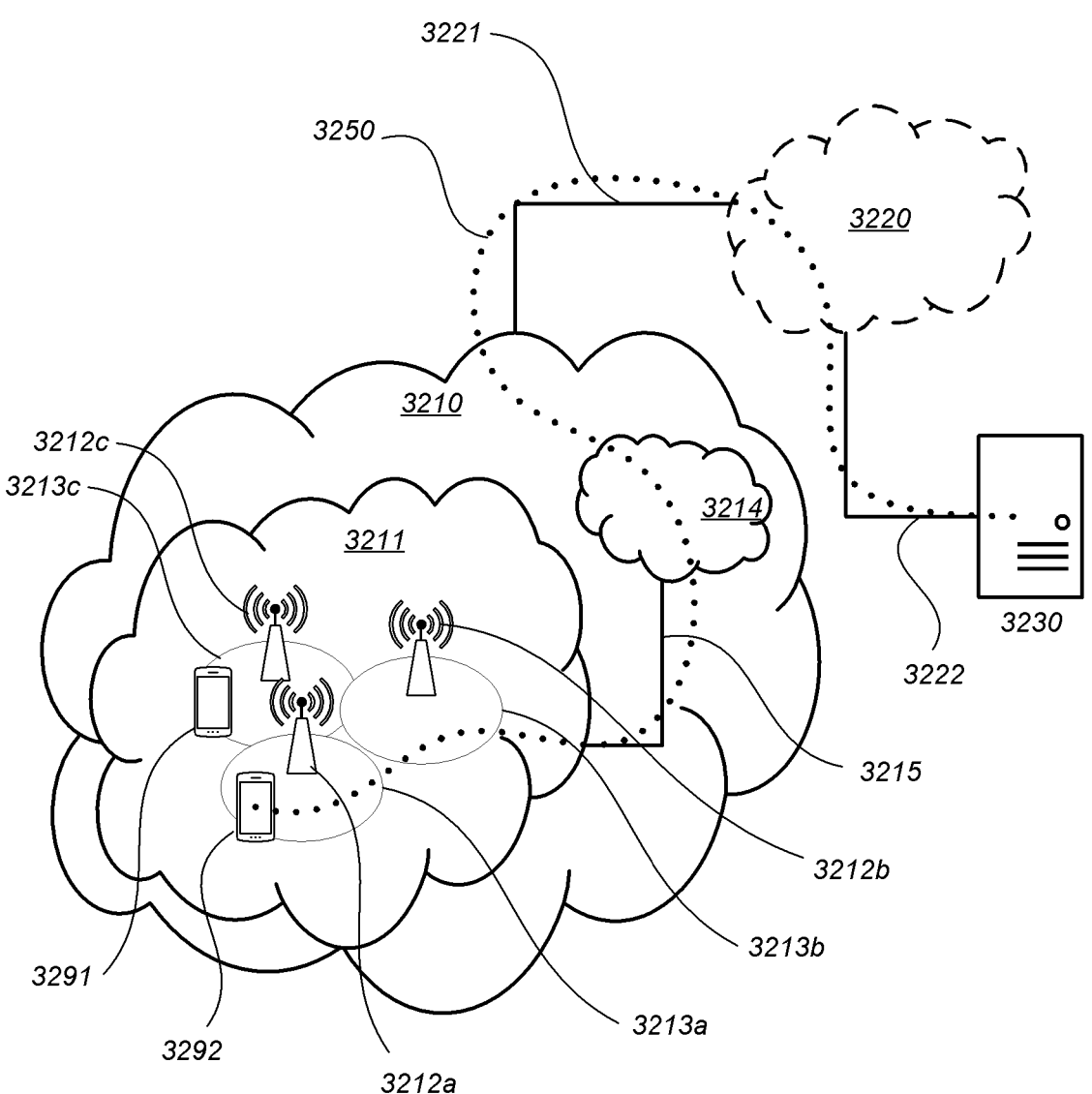
FIG. 12 schematically illustrates a telecommunication network connected via an intermediate network to a host computer.

With reference to FIG. 12, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
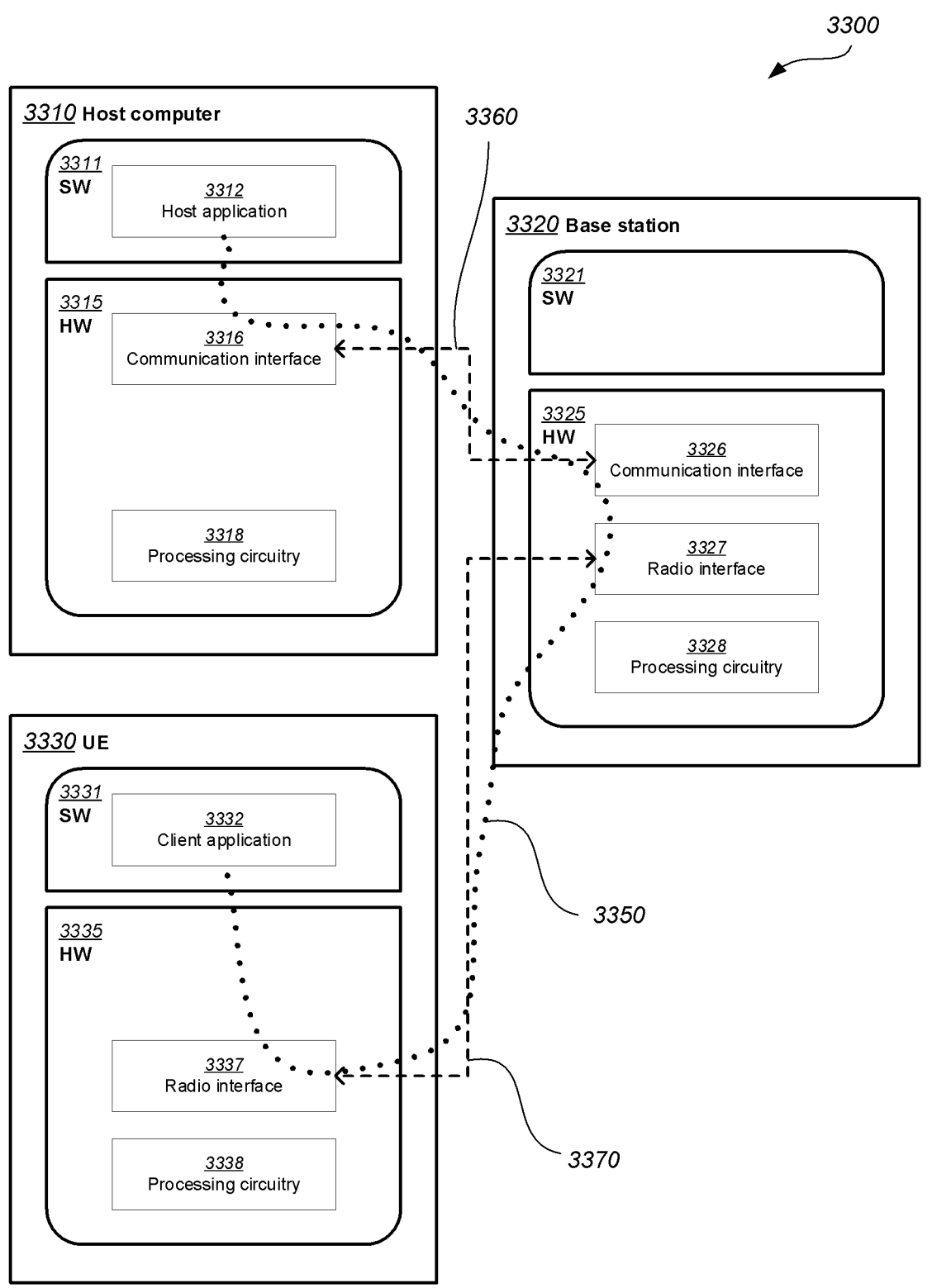
FIG. 13 is a generalized block diagram of a host computer communicating via a base station with a user equipment over a partially wireless connection.

It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 12, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the overall performance of uplink data transmission and thereby provide benefits such as reduced user waiting time, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Correspondingly to the method 900 as described above, an exemplary terminal device is provided. FIG. 18 is a block diagram of a terminal device 1800 according to an embodiment of the present disclosure. The terminal device 1800 can be e.g., a UE. The terminal device 1800 may function as a UE.

The terminal device 1800 can be configured to perform the method 900 as described above in connection with FIG. 9. As shown in FIG. 18, the terminal device 1800 may comprise a receiving module 1810 configured to receive, from a network node, a first message indicating at least one parameter for a Physical Uplink Shared Channel (PUSCH) transmission; and a transmitting module 1820 configured to transmit, to the network node, the PUSCH transmission at least partially based on the first message.

The above modules 1810 and/or 1820 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 9. Further, the terminal device 1800 may comprise one or more further modules, each of which may perform any of the steps of the method 900 described with reference to FIG. 9.

Correspondingly to the method 1000 as described above, a network node is provided. FIG. 19 is a block diagram of an exemplary network node 1900 according to an embodiment of the present disclosure. The network node 1900 can be e.g., a serving network node of the above terminal device.

The network node 1900 can be configured to perform the method 1000 as described above in connection with FIG. 10. As shown in FIG. 19, the network node 1900 may comprise a transmitting module 1910 configured to transmit, to a terminal device, a first message indicating at least one parameter for a Physical Uplink Shared Channel (PUSCH) transmission; and a receiving module 1920 configured to receive, from the terminal device, the PUSCH transmission at least partially based on the first message.

The above modules 1910 and/or 1920 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 10. Further, the terminal device 1900 may comprise one or more further modules, each of which may perform any of the steps of the method 1000 described with reference to FIG. 10.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

| Abbreviation | Explanation |
|---|---|
| BS | Base station |
| CRC | Cyclic Redundancy Check |
| CRM | Contention Resolution Message |
| DCI | Downlink Control Information |
| DL | Downlink |
| DM-RS | Demodulation Reference Signal |
| eMTC | Enhanced Machine Type Communication |
| FH | Frequency Hopping |
| FR1 | Frequency Range 1 |
| FR2 | Frequency Range 2 |
| HARQ | Hybrid Automated Retransmission Request |
| MAC | Medium Access Control |
| Msg3 | Message 3 |
| NB-IoT | Narrow-Band Internet of Things |
| PDCCH | Physical Downlink Control Channel |
| PUSCH | Physical Uplink Shared Data Channel |
| PRACH | Physical Random Access Channel |
| PRB | Physical Resource Block, i.e. 12 consecutive subcarriers |
| RACH | Random Access Channel |
| RSRP | Reference Signal Received Power |
| TB | Transport Block |
| RNTI | Radio Network Temporary Identifier |
| TxD | Transmit Diversity |
| UE | User Equipment |
| UL | Uplink |
| gNB | (Base station) |

What is claimed is:

1. A method at a terminal device, the method comprising:

receiving, from a network node, a first message indicating at least one parameter for a Physical Uplink Shared Channel (PUSCH) transmission; and transmitting, to the network node, the PUSCH transmission at least partially based on the first message;

wherein the first message indicates a number of repetitions for the PUSCH transmission;

wherein before the step of transmitting, to the network node, the PUSCH transmission at least partially based on the first message, the method further comprises:

measuring downlink channel quality; and determining whether the terminal device is in good or poor coverage at least partially based on the measured downlink channel quality;

wherein the method further comprises: receiving, from the network node, a threshold;

wherein the step of determining whether the terminal device is in good or poor coverage at least partially based on the measured downlink channel quality comprises:

determining whether the terminal device is in good or poor coverage by comparing the measured downlink channel quality with the threshold; and transmitting, to the network node, an indication indicating whether the terminal device is in good or poor coverage.

2. The method of claim 1, wherein the first message indicates a parameter of the PUSCH transmission in time domain.

3. The method of claim 1, wherein the number is greater than 16.

4. The method of claim 1, wherein the number is different from any of 1, 2, 3, 4, 7, 8, 12, and 16.

5. The method of claim 1, wherein the parameter has more than 8 candidate values and no more than 16 candidate values.

6. The method of claim 1, wherein during the step of transmitting, to the network node, the PUSCH transmission at least partially based on the first message, the method further comprises:

receiving, from the network node, a second message indicating that the PUSCH transmission is successfully decoded at the network node before the transmission of all the repetitions for the PUSCH transmission is completed; and prohibiting or skipping the transmission of the remaining repetitions.

7. The method of claim 1, wherein the first message is a first Physical Downlink Control Channel (PDCCH) message carrying Downlink Control Information (DCI) with a format for uplink (UL) grant, the second message is a second PDCCH message carrying DCI.

8. The method of claim 1, wherein the second message further indicates at least one of:

the number of repetitions of the PUSCH transmission which has been received by the network node; and the number of repetitions of the PUSCH transmission which can be omitted.

9. The method of claim 1, wherein the step of transmitting, to the network node, the PUSCH transmission at least partially based on the first message comprises:

transmitting, to the network node, a repetition of the PUSCH transmission which is segmented around one or more invalid symbols which are scheduled to be transmitted or received simultaneously with the repetition.

10. The method of claim 1, wherein when the repetitions of the PUSCH transmission are type A repetitions, the invalid symbols comprise at least one of:

a downlink (DL) symbol;

a symbol of Uplink Control Information (UCI) which fails timeline check and cannot be multiplexed with the repetition;

a symbol of another PUCCH or PUSCH transmission with a higher PHY priority than that of the repetition; and a symbol for which its corresponding higher layer parameter InvalidSymbolPattern has a value of 1.

11. The method of claim 1, wherein before the step of transmitting, to the network node, the PUSCH transmission at least partially based on the first message, the method further comprises:

determining uplink transmit power; and determining whether the terminal device is in good or poor coverage at least partially further based on the determined uplink transmit power.

12. The method of claim 1, wherein the step of determining whether the terminal device is in good or poor coverage at least partially further based on the determined uplink transmit power comprises: determining whether the terminal device is in good or poor coverage by comparing the determined uplink transmit power with the threshold.

13. The method of claim 1, wherein when the transmission of the third message occurs before the reception of the first message, the first message configures a parameter indicating a number of repetitions for the PUSCH transmission, and the first message is determined at least partially based on the third message.

14. The method of claim 1, wherein before the step of transmitting, to the network node, the PUSCH transmission at least partially based on the first message, the method further comprises:

measuring downlink channel quality; and determining a number of repetitions for the PUSCH transmission at least partially based on the measured downlink channel quality.

15. The method of claim 1, wherein the first message indicates a frequency hopping configuration.

16. The method of claim 1, wherein the frequency hopping configuration further comprises at least one of:

at least a number of hops, the number being greater than 2;

frequency hopping offsets or frequency hopping offset list; and duration of a hop.

17. The method of claim 1, wherein the first message further indicates whether transmit diversity is to be used for the PUSCH transmission.

18. A terminal device comprising:

a processor; and a memory storing instructions which, when executed by the processor, cause the processor to perform:

receiving, from a network node, a first message indicating at least one parameter for a Physical Uplink Shared Channel (PUSCH) transmission; and transmitting, to the network node, the PUSCH transmission at least partially based on the first message;

wherein the first message indicates a number of repetitions for the PUSCH transmission;

wherein before the step of transmitting, to the network node, the PUSCH transmission at least partially based on the first message, the method further comprises:

measuring downlink channel quality;

determining whether the terminal device is in good or poor coverage at least partially based on the measured downlink channel quality;

wherein the method further comprises: receiving, from the network node, a threshold; and wherein the step of determining whether the terminal device is in good or poor coverage at least partially based on the measured downlink channel quality comprises: determining whether the terminal device is in good or poor coverage by comparing the measured downlink channel quality with the threshold; and transmitting, to the network node, an indication indicating whether the terminal device is in good or poor coverage.

19. A method at a network node, the method comprising:

transmitting, to a terminal device, a first message indicating at least one parameter for a Physical Uplink Shared Channel (PUSCH) transmission;

receiving, from the terminal device, the PUSCH transmission at least partially based on the first message;

transmitting, to the terminal device, a threshold for determining whether the terminal device is in good or poor coverage, wherein the first message indicates a first number of repetitions for the PUSCH transmission;

wherein the threshold is used for determining whether the terminal device is in good or poor coverage by comparing a measured downlink channel quality with the threshold; and receiving, to from the network node, an indication indicating whether the terminal device is in good or poor coverage.

* * * * *